US011188514B2

(12) United States Patent
Amundson

(10) Patent No.: US 11,188,514 B2
(45) Date of Patent: Nov. 30, 2021

(54) FISHING TOURNAMENT PLATFORM FOR CREATING, MANAGING, JOINING, AND PARTICIPATING IN FISHING TOURNAMENTS

(71) Applicant: Darren Amundson, Shoreview, MN (US)

(72) Inventor: Darren Amundson, Shoreview, MN (US)

( * ) Notice: Subject to any disclaimer, the term of this patent is extended or adjusted under 35 U.S.C. 154(b) by 53 days.

(21) Appl. No.: 16/272,758

(22) Filed: Feb. 11, 2019

(65) Prior Publication Data

US 2019/0251074 A1    Aug. 15, 2019

Related U.S. Application Data

(60) Provisional application No. 62/628,452, filed on Feb. 9, 2018.

(51) Int. Cl.
*G06F 16/23* (2019.01)
*G06F 21/60* (2013.01)

(52) U.S. Cl.
CPC ........ *G06F 16/2365* (2019.01); *G06F 21/602* (2013.01)

(58) Field of Classification Search
CPC ......... A63F 13/818; A01K 99/00; G06F 8/60; G06F 9/451; G06F 16/2365
USPC .......................................................... 707/697
See application file for complete search history.

(56) References Cited

U.S. PATENT DOCUMENTS

| | | | | |
|---|---|---|---|---|
| 8,602,875 | B2 * | 12/2013 | Nguyen | G07F 17/3225 |
| | | | | 463/25 |
| 9,486,697 | B2 * | 11/2016 | Nguyen | G07F 17/3288 |
| 10,140,816 | B2 * | 11/2018 | Nguyen | G07F 17/3244 |
| 10,713,065 | B2 * | 7/2020 | Yang | A01K 99/00 |
| 2004/0220856 | A1 * | 11/2004 | Moore | G06K 19/07758 |
| | | | | 705/14.23 |
| 2011/0092271 | A1 * | 4/2011 | Nguyen | G07F 17/3211 |
| | | | | 463/25 |
| 2012/0077586 | A1 * | 3/2012 | Pishevar | A63F 13/327 |
| | | | | 463/31 |
| 2013/0196779 | A1 * | 8/2013 | Nguyen | G07F 17/34 |
| | | | | 463/43 |
| 2017/0024418 | A1 * | 1/2017 | Shafter | G06F 16/24578 |
| 2017/0032619 | A1 * | 2/2017 | Nguyen | G07F 17/3211 |
| 2018/0260233 | A1 * | 9/2018 | Yang | G06Q 50/10 |

* cited by examiner

*Primary Examiner* — Sheree N Brown

(57) ABSTRACT

This is a platform with improved methods and systems for creating, running, joining, viewing and participating in fishing tournaments. It includes a client-side tournament application running on electronic devices that accesses a central server. It uses the client-side tournament application to document fish submissions, resulting in validated fish submissions displayed on live leaderboards with authentic fish media from a trusted source. It prevents cheating in multiple forms and makes it easier to verify said fish submissions. It includes a method for creating tournaments including single-species or multi-species tournaments with complex leaderboard characteristics, while keeping it easy for a participant to enter a fish. The platform makes it easier to run tournaments in wider geographical areas and for longer durations than tournaments have typically ran in the past. Said tournaments are easier to run and better for fish.

5 Claims, 51 Drawing Sheets

Platform Overview

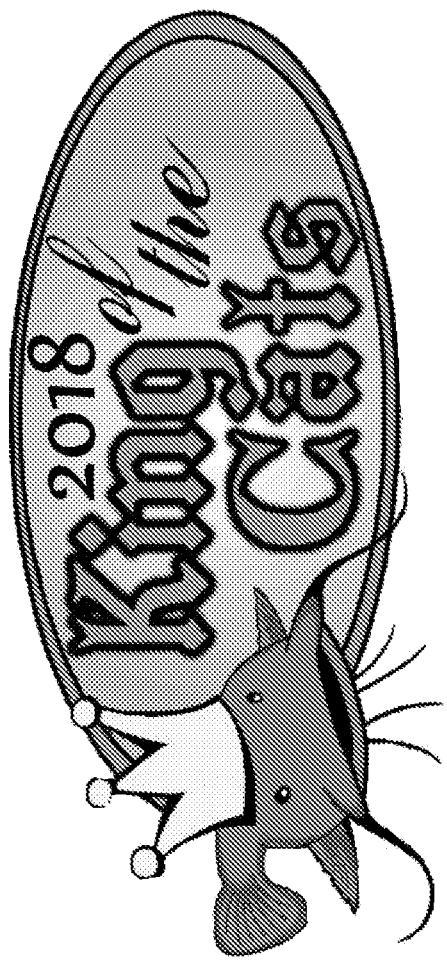
Fig. 1 – Prior Art of Control Item

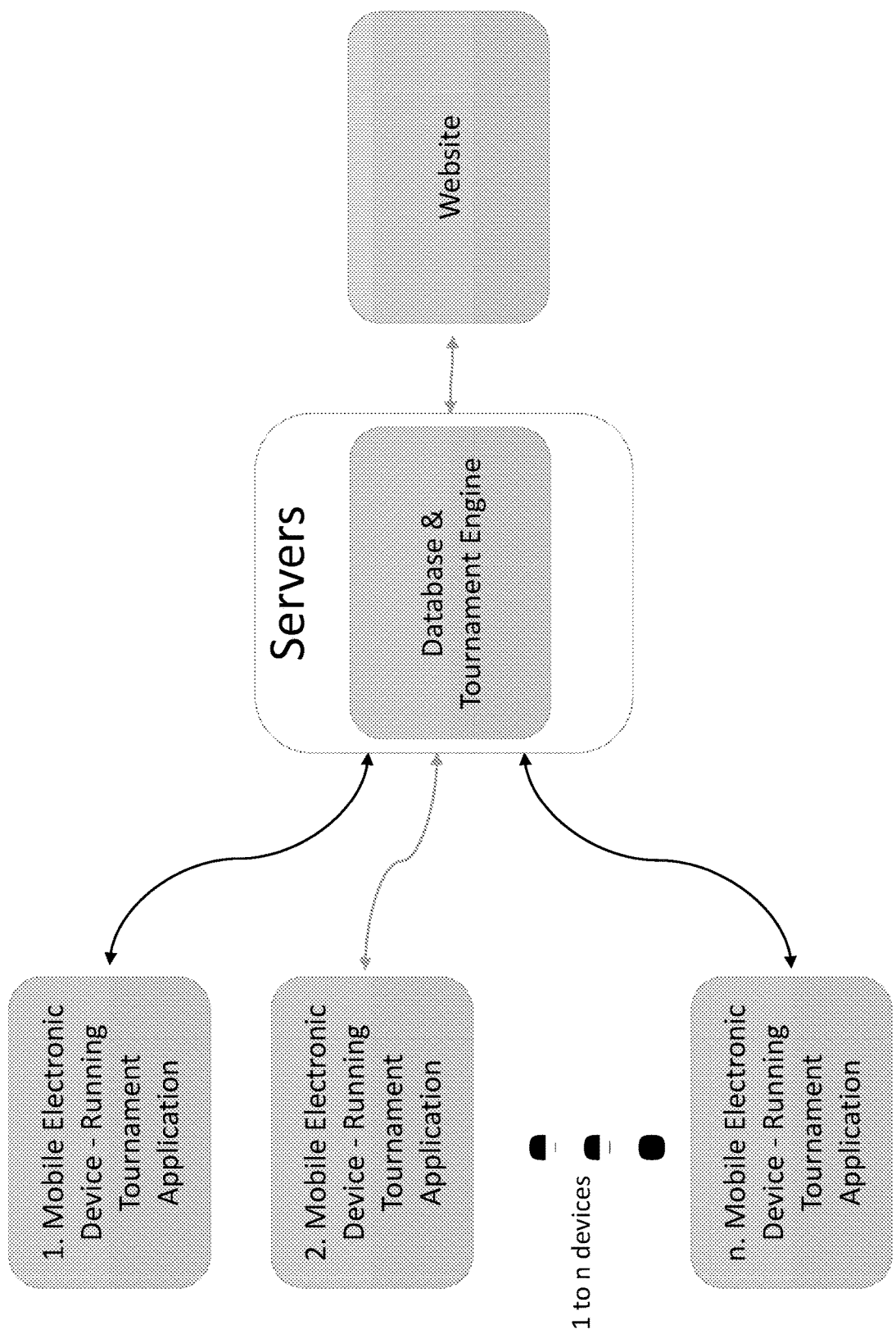
Fig. 2 Platform Overview

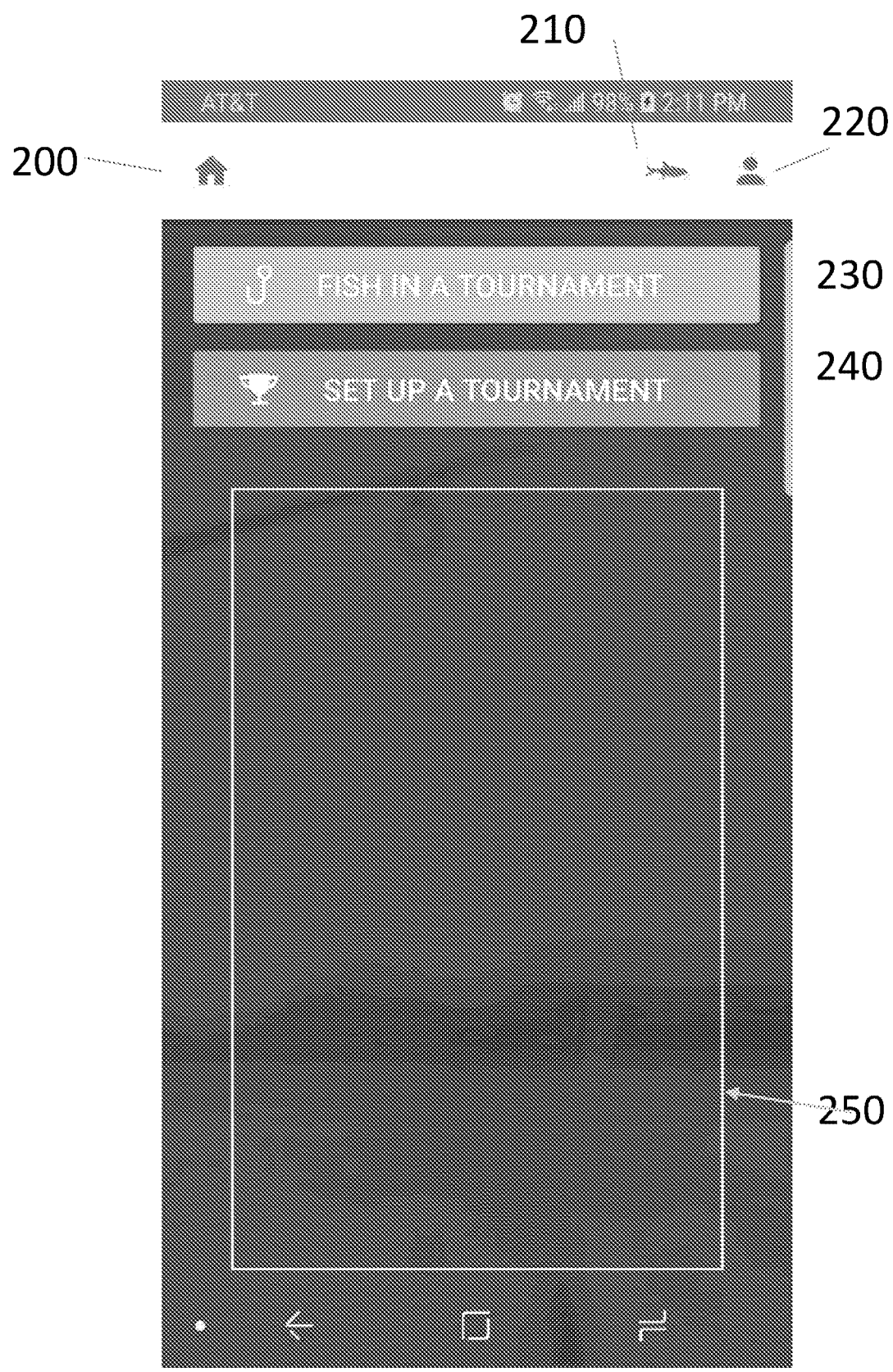
Fig. 3 – Home Screen

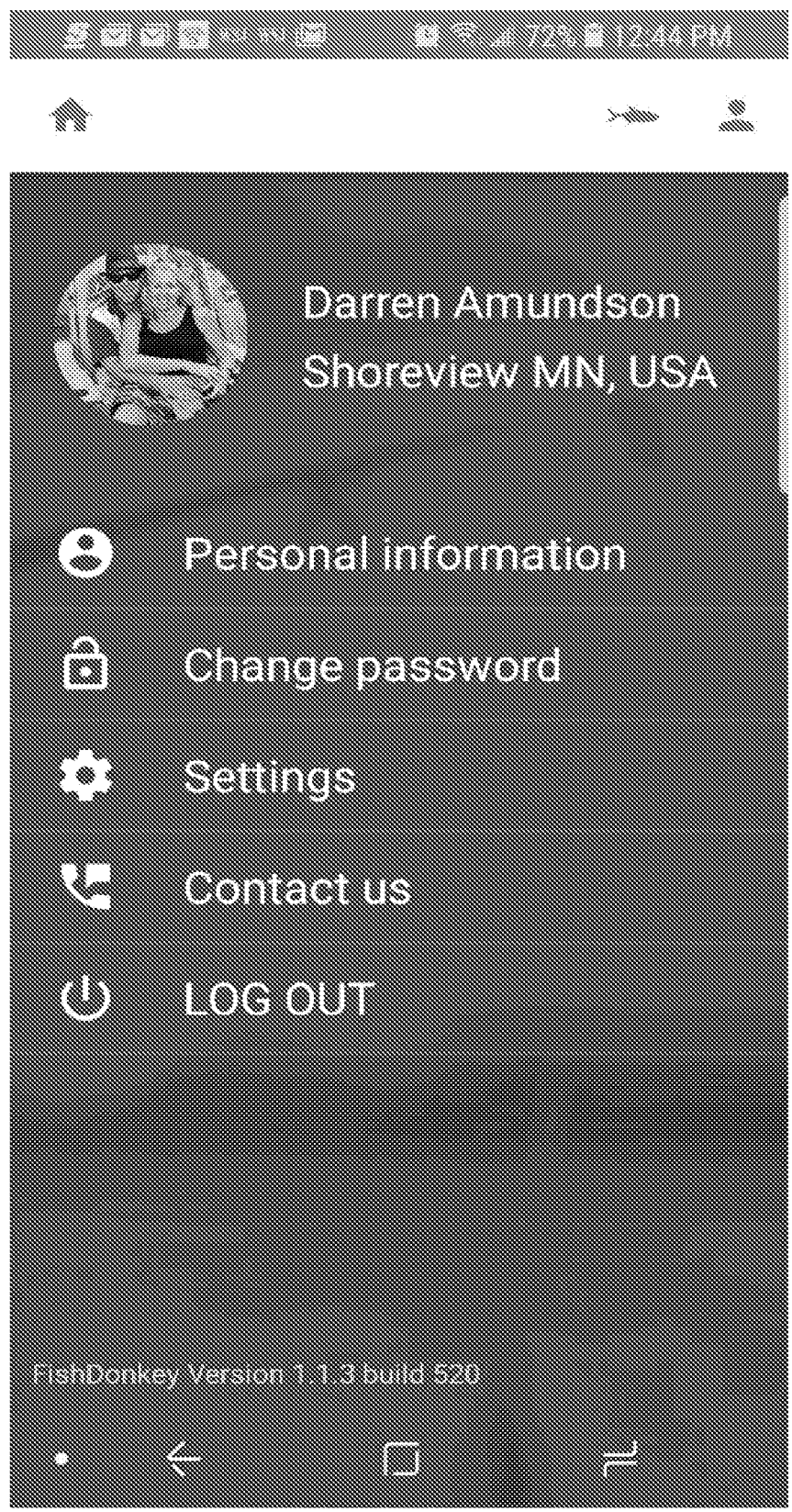
Fig. 4 – User Profile

Fig. 5 – Personal Information

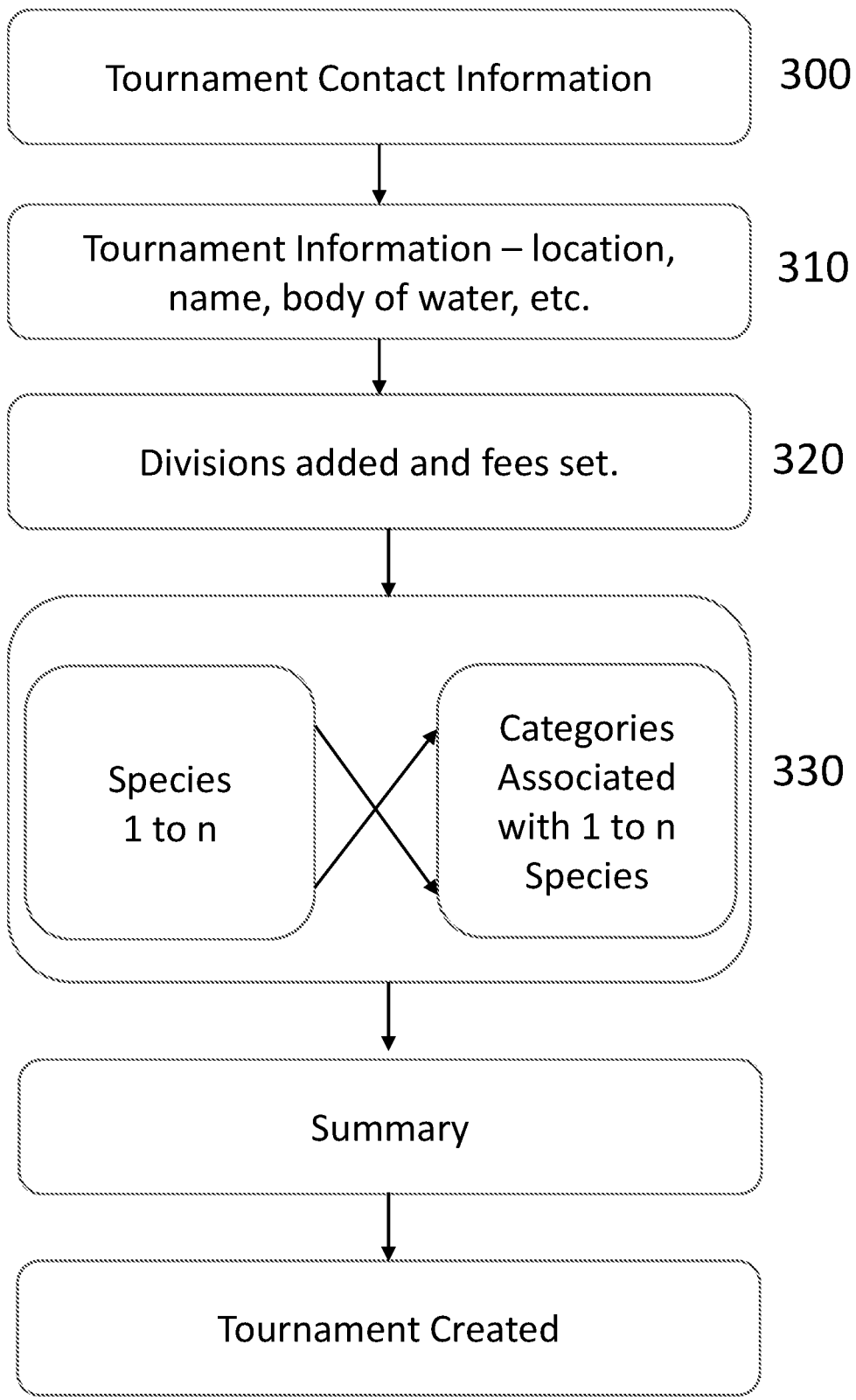
Fig. 6 – Setting up a Tournament

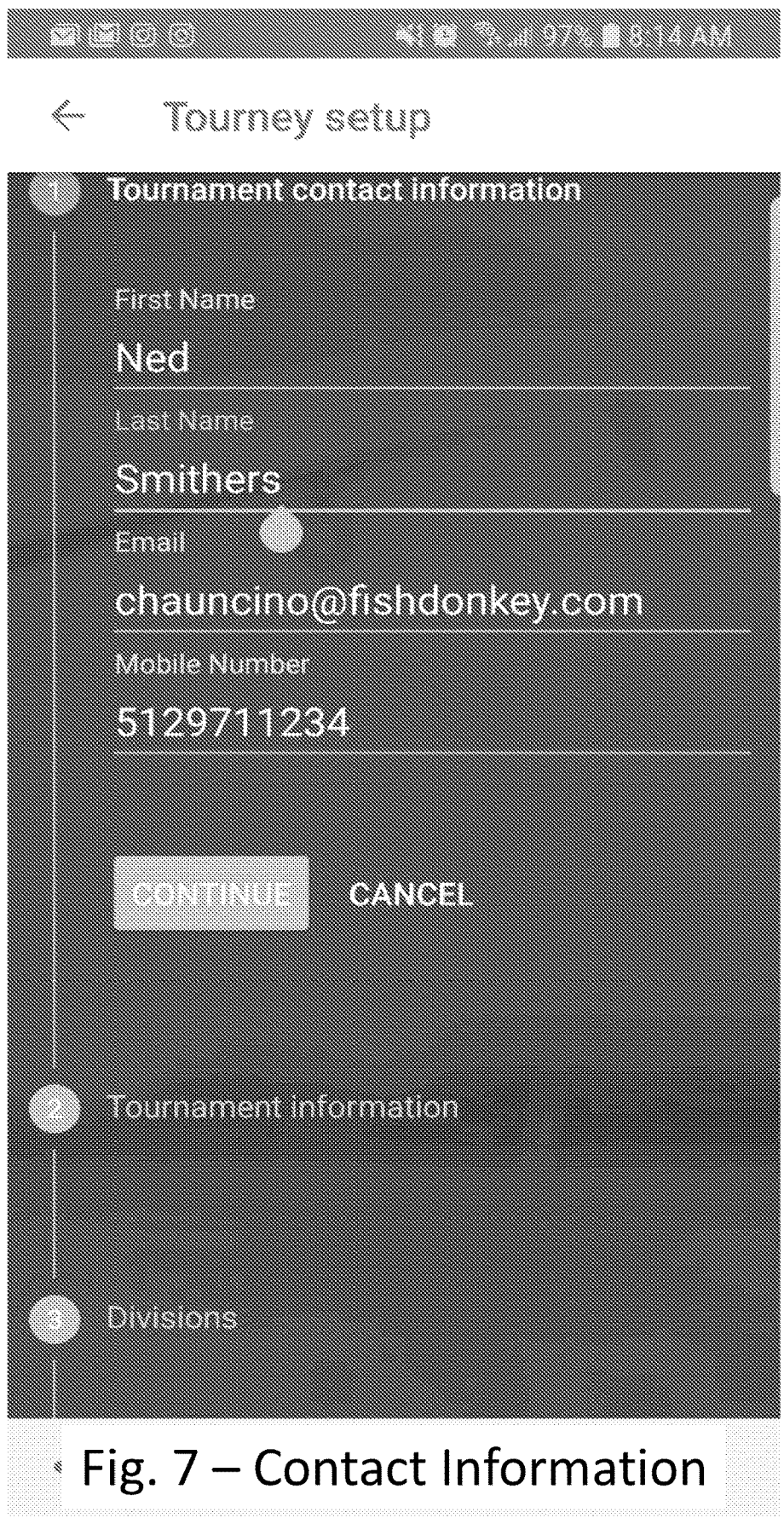
Fig. 7 – Contact Information

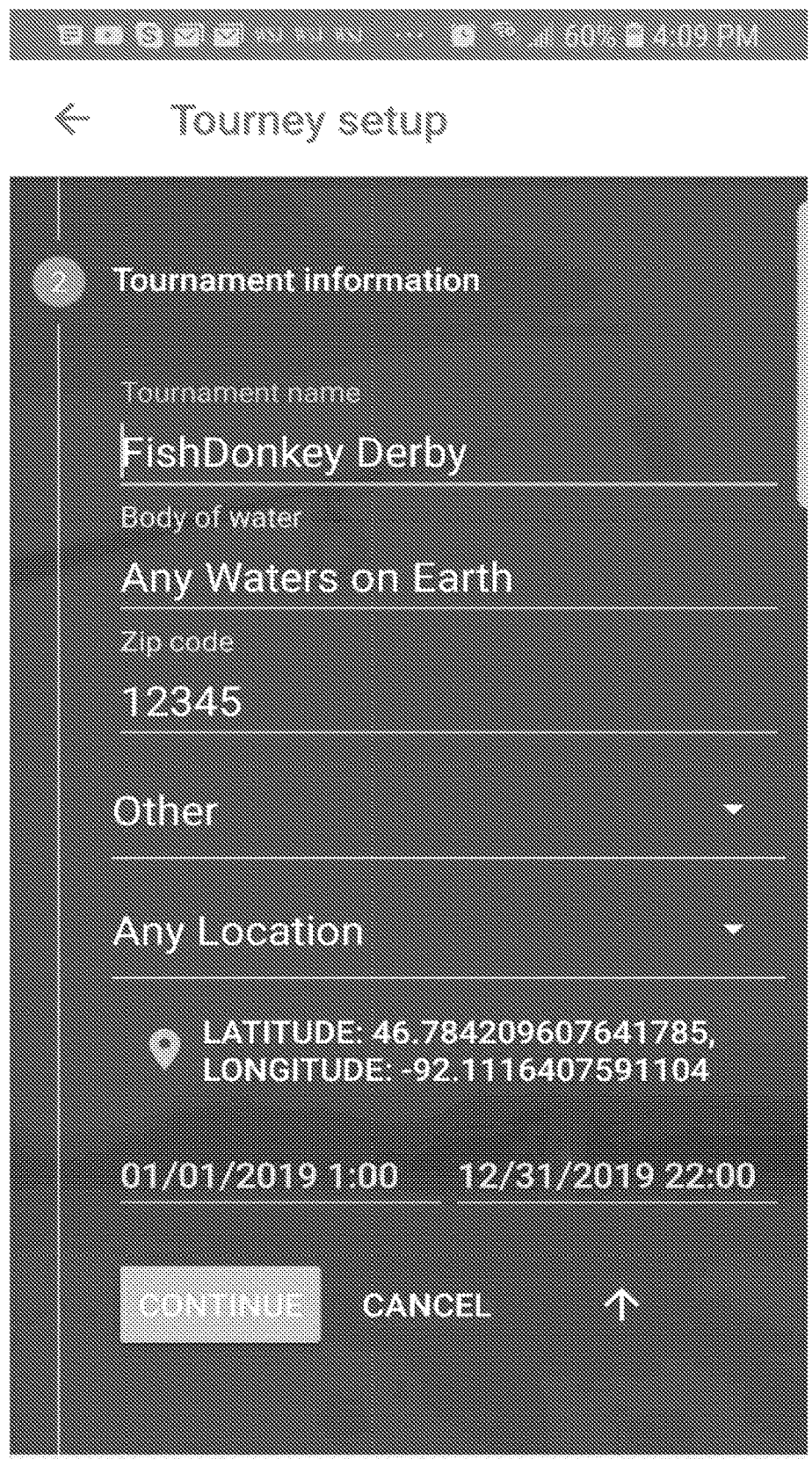
Fig. 8 – Tournament Information

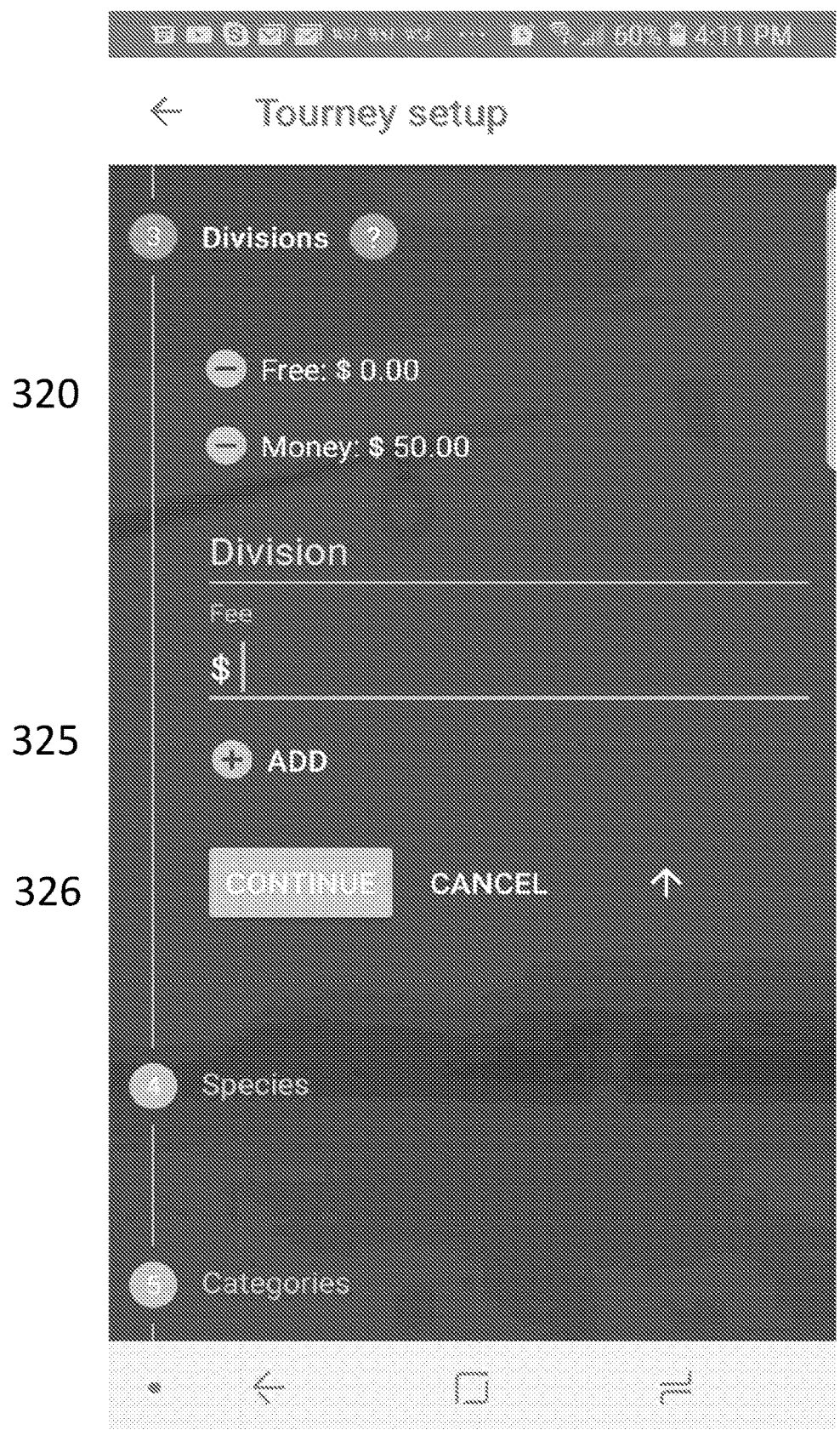
Fig. 9 – Divisions & Fees

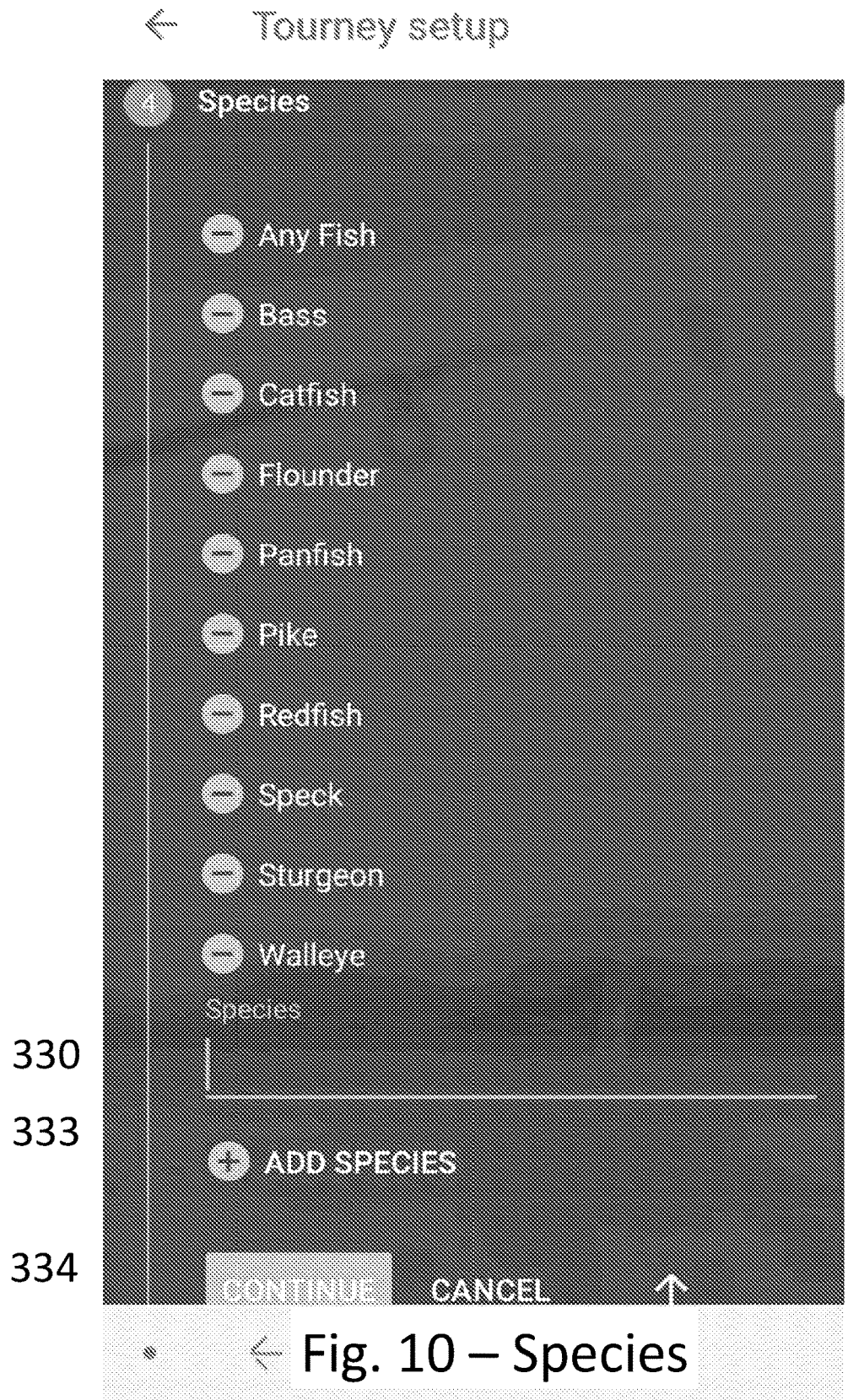
Fig. 10 – Species

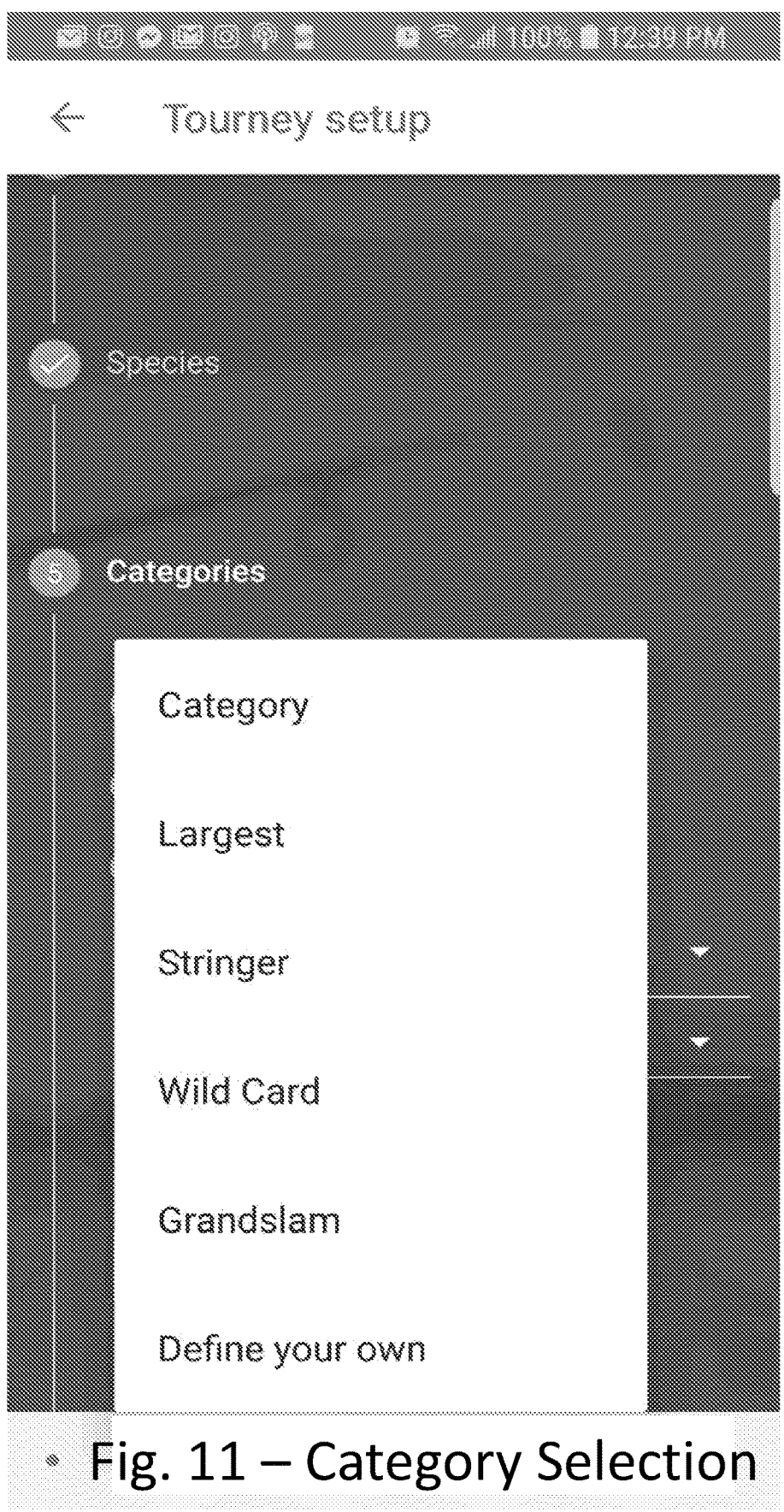
Fig. 11 – Category Selection

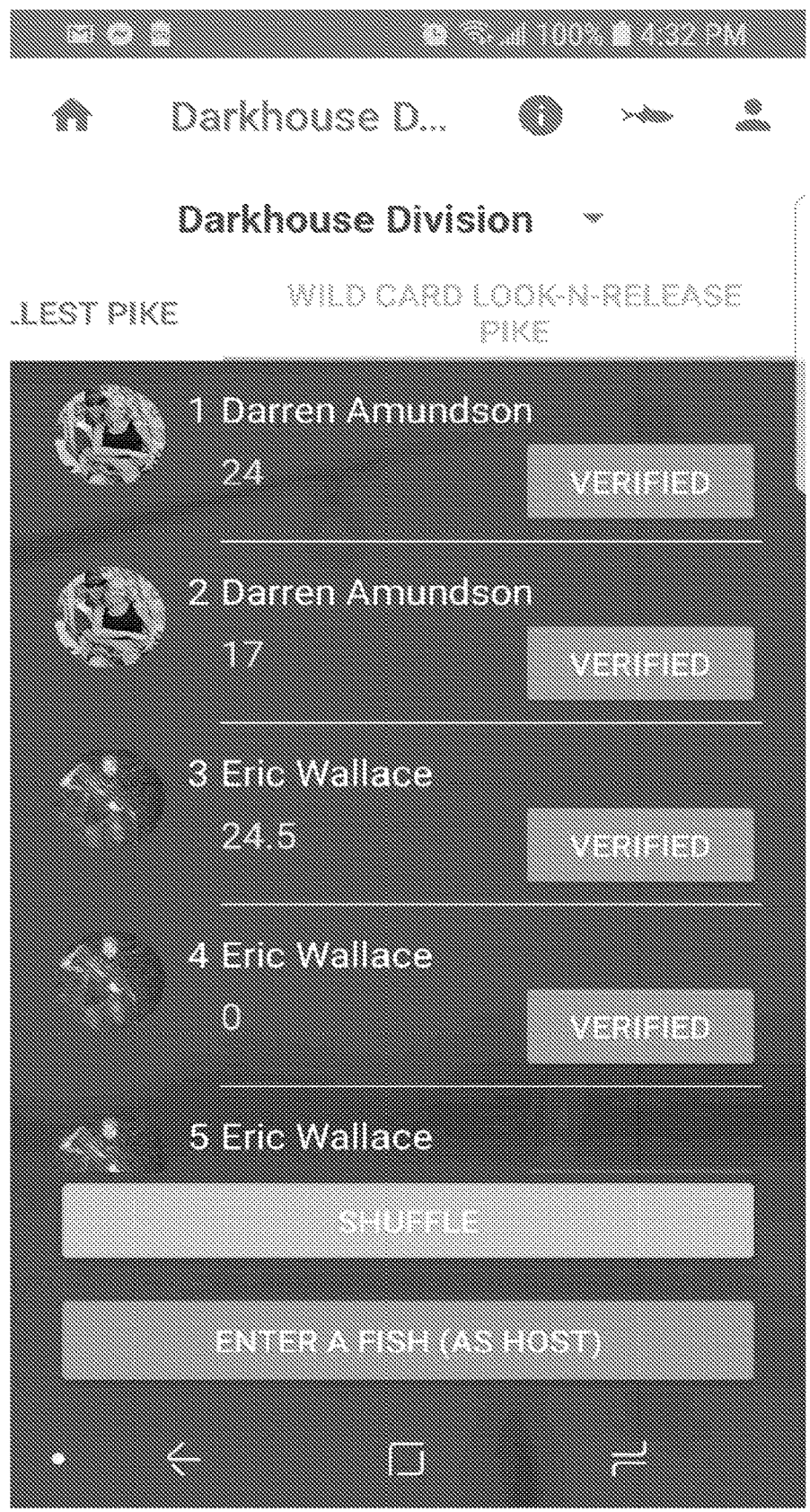
Fig. 12 – Wild Card

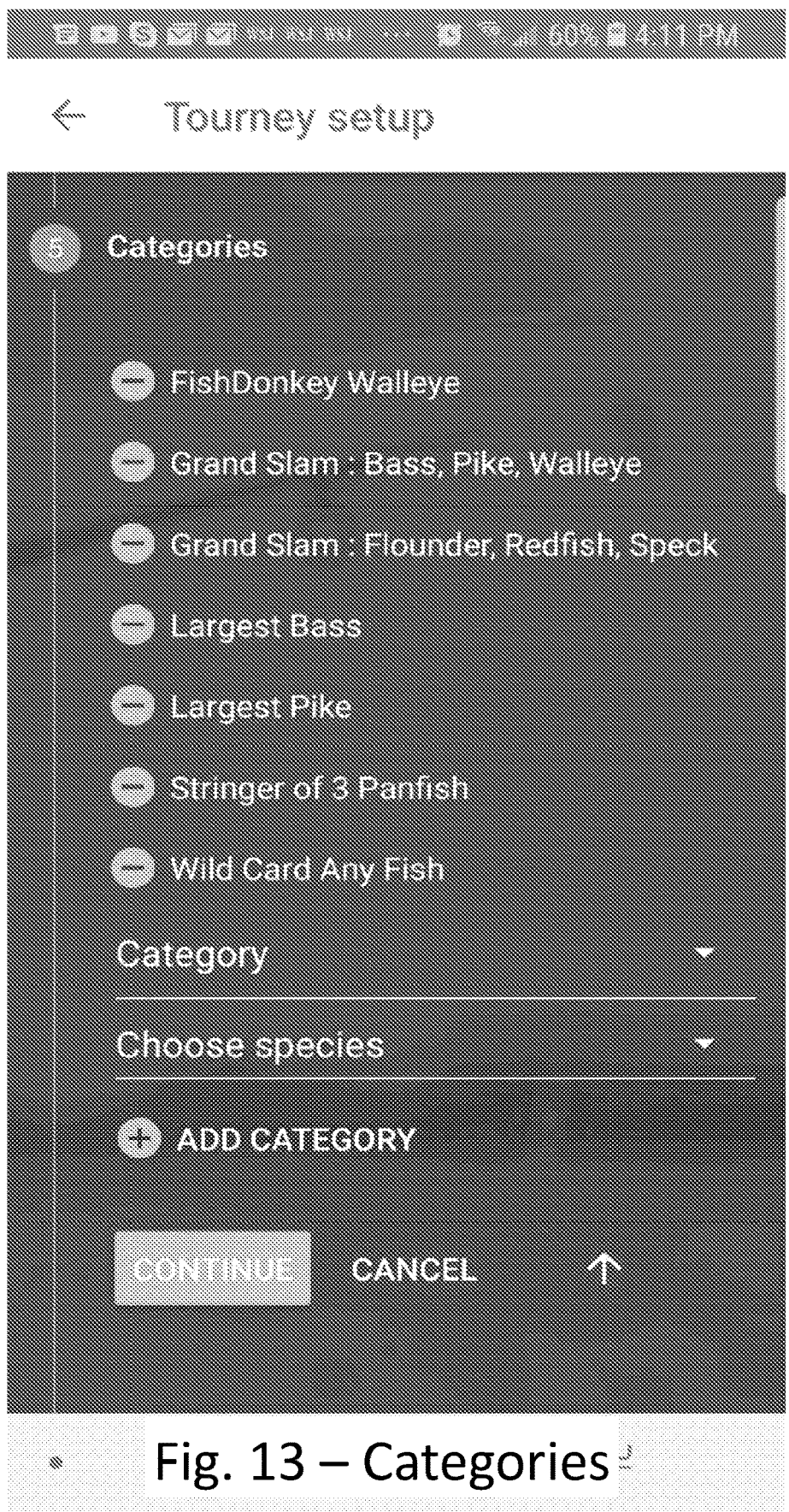
Fig. 13 – Categories

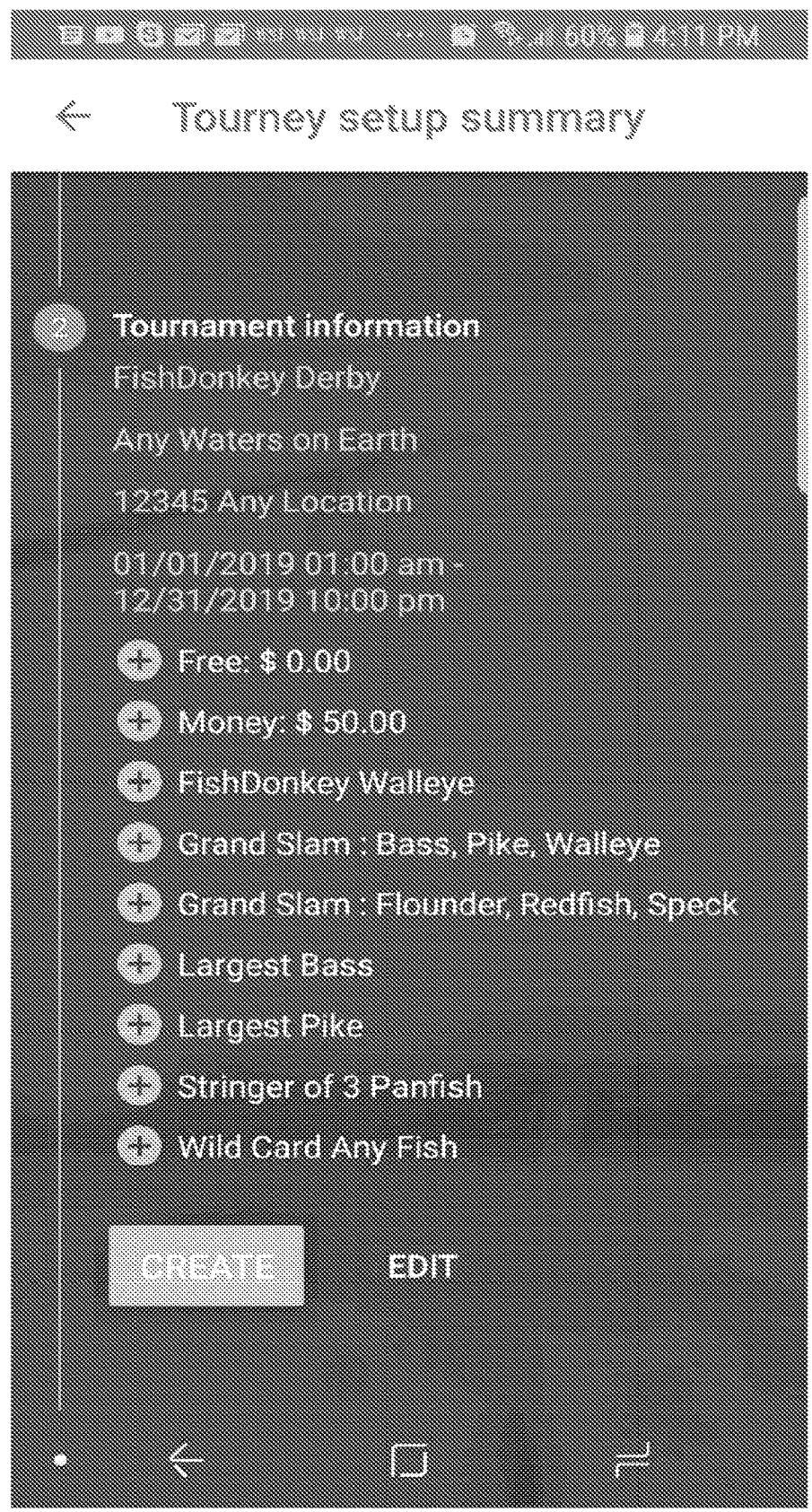
Fig. 14 – Summary

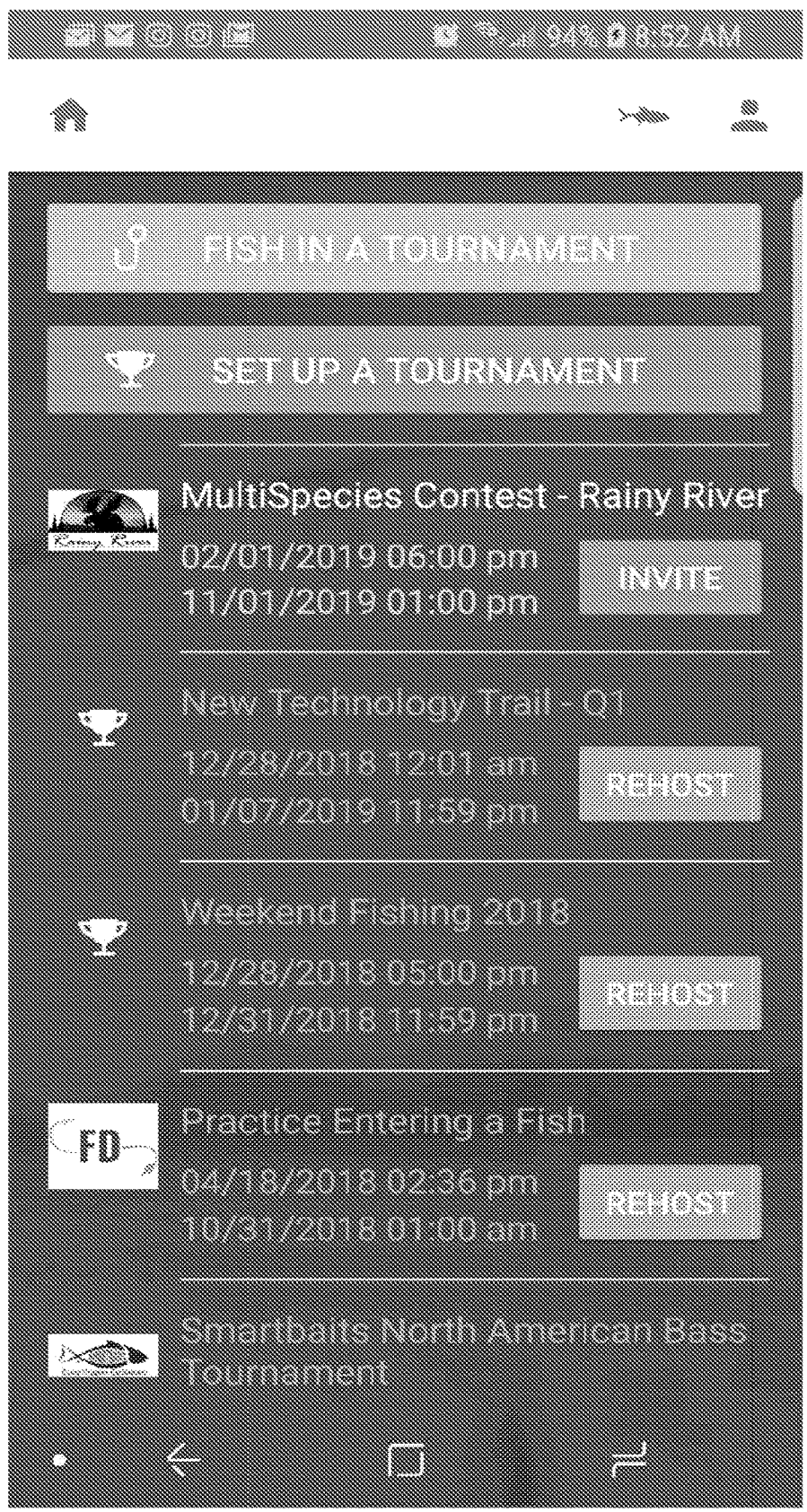
Fig. 15 – Rehost Screen

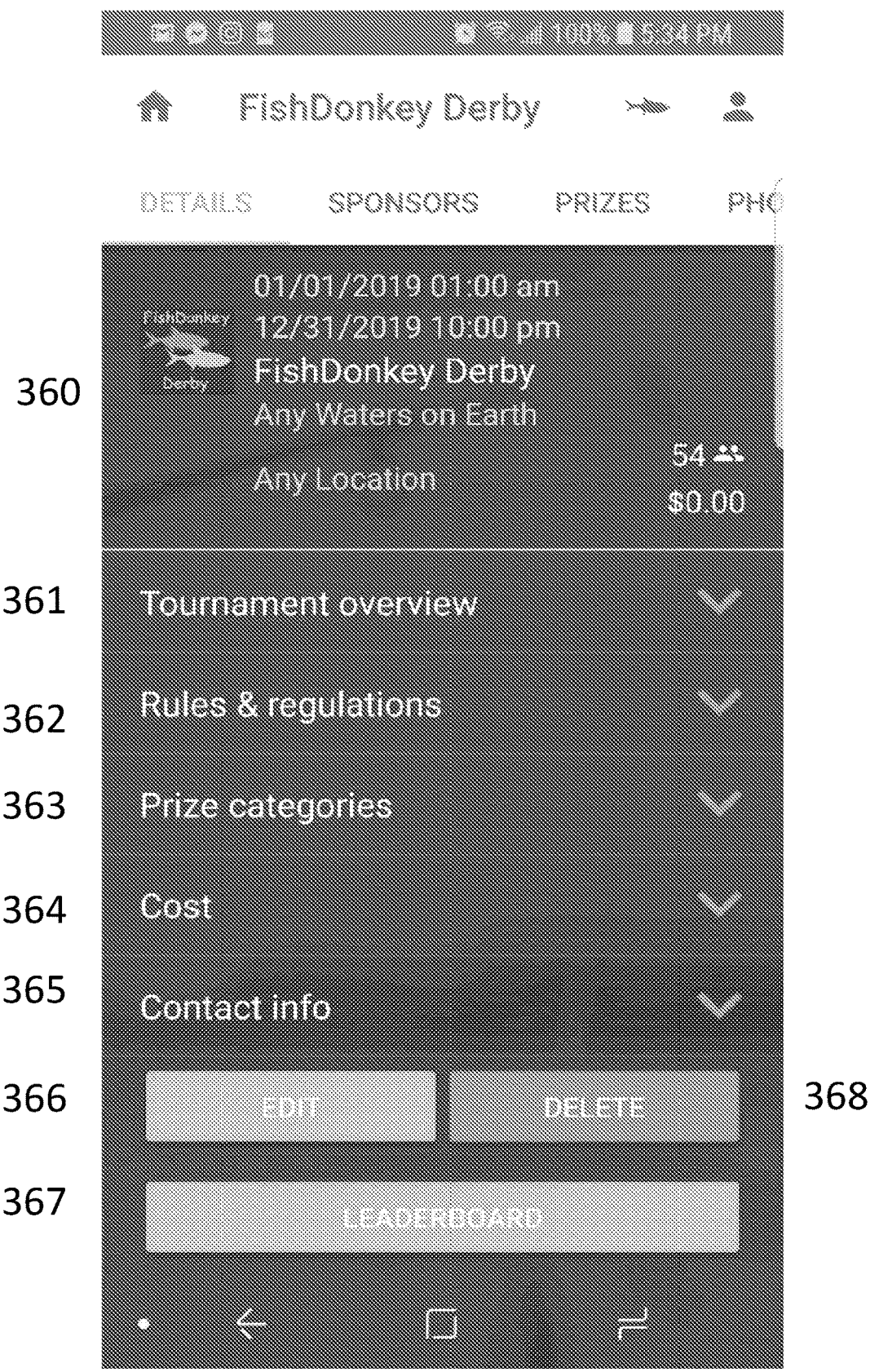
Fig. 16 – Tournament Created

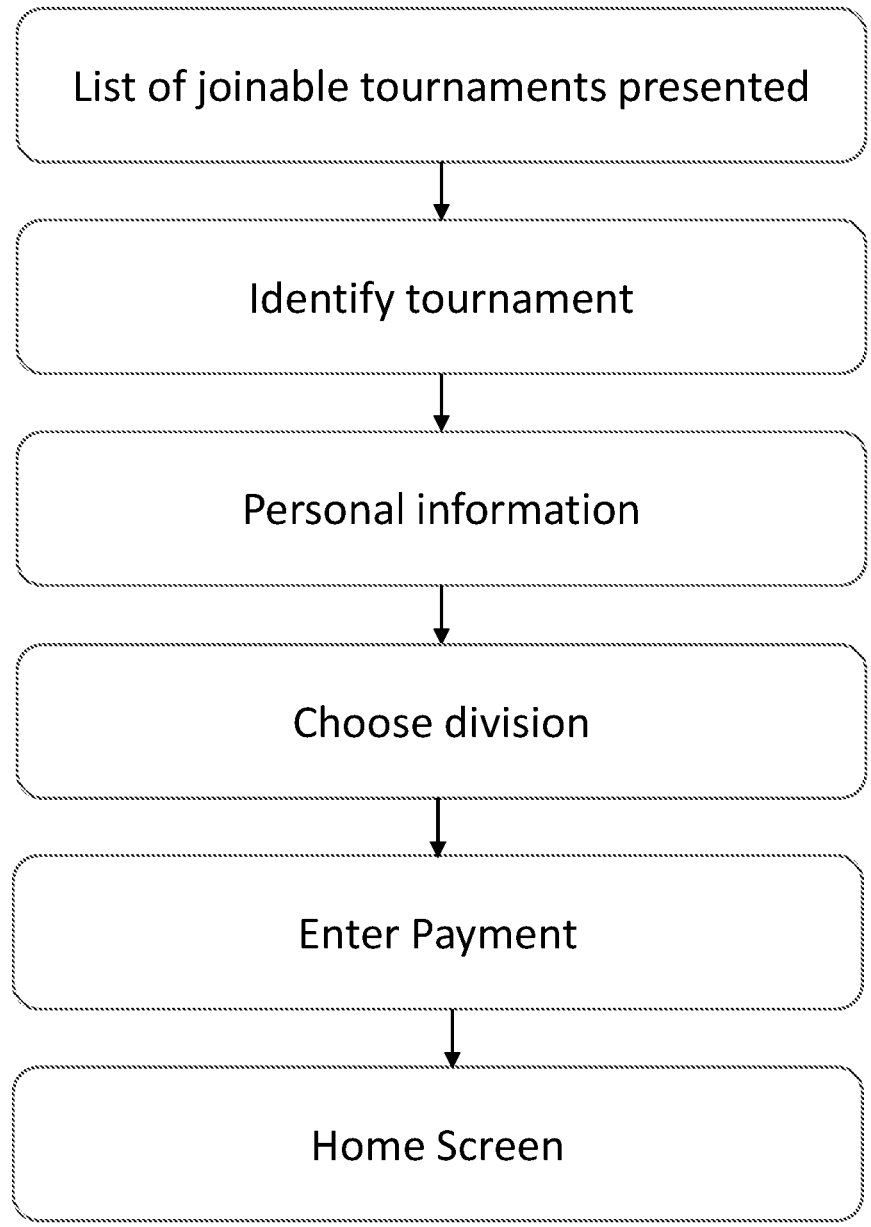
Fig. 17 – Join a Tournament

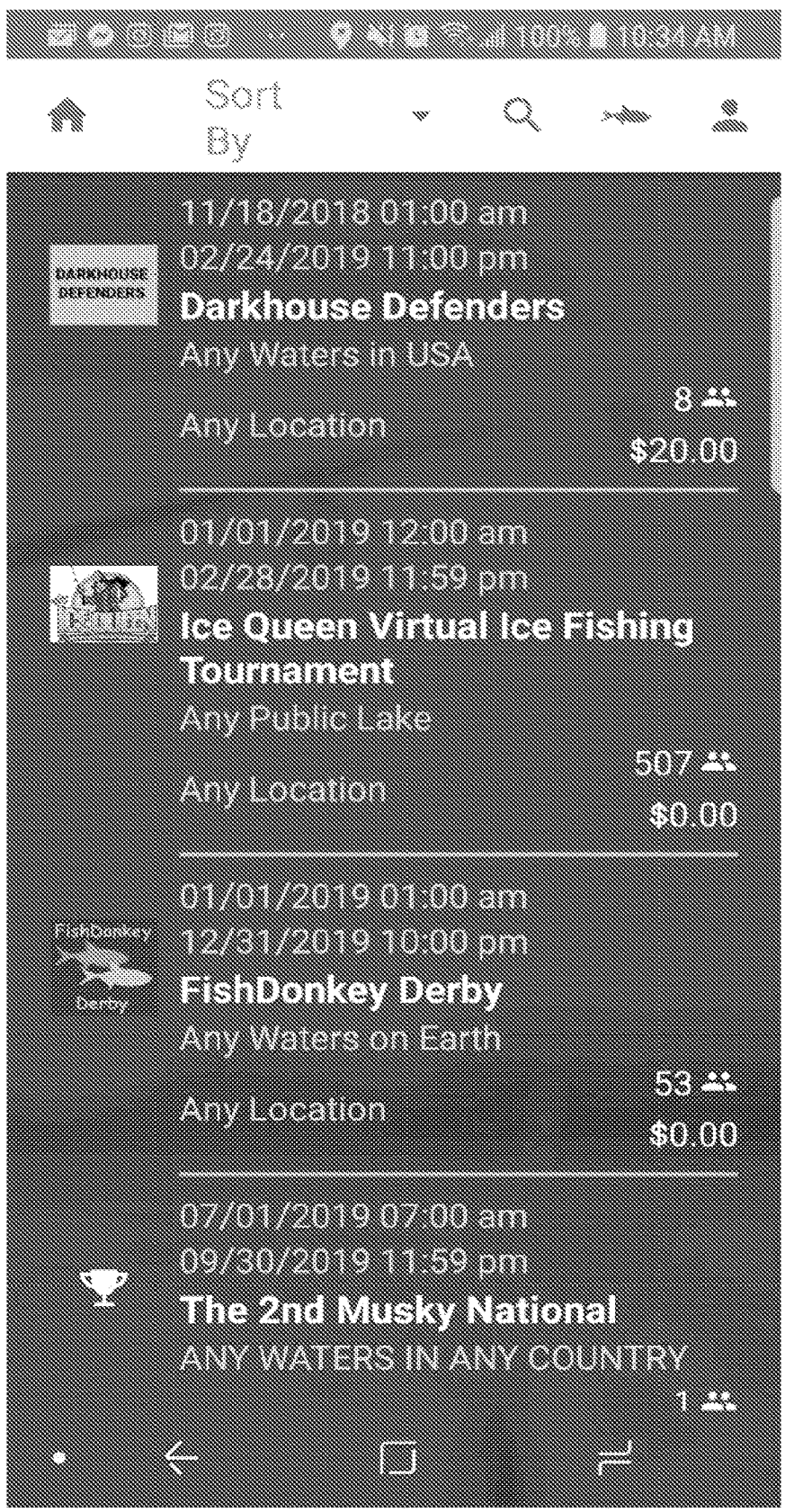
Fig. 18 – Joinable List

Fig. 19 – Identify Tournament

415

Fig. 20 – Personal Information

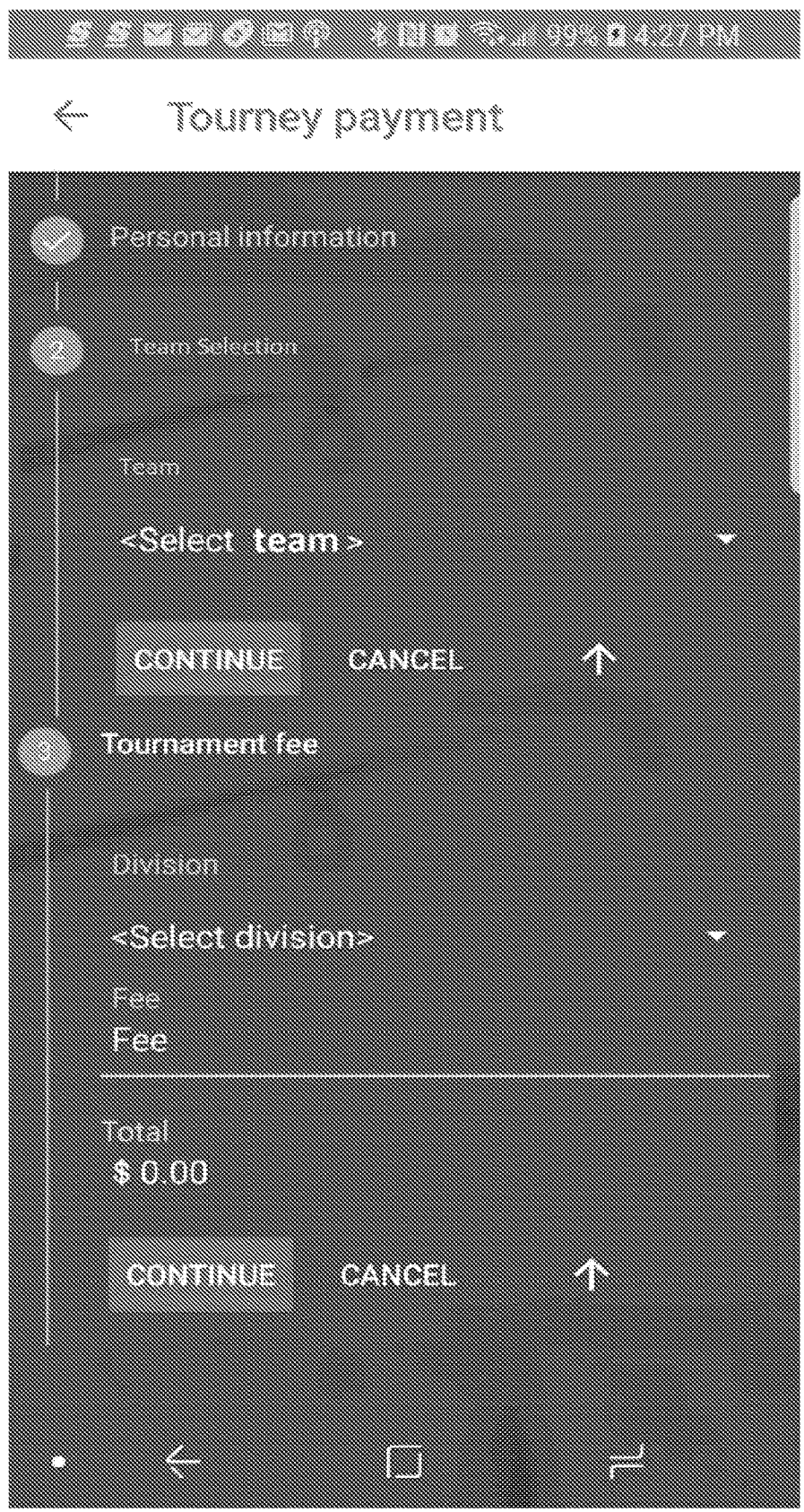
Fig. 21 – Team Fishing

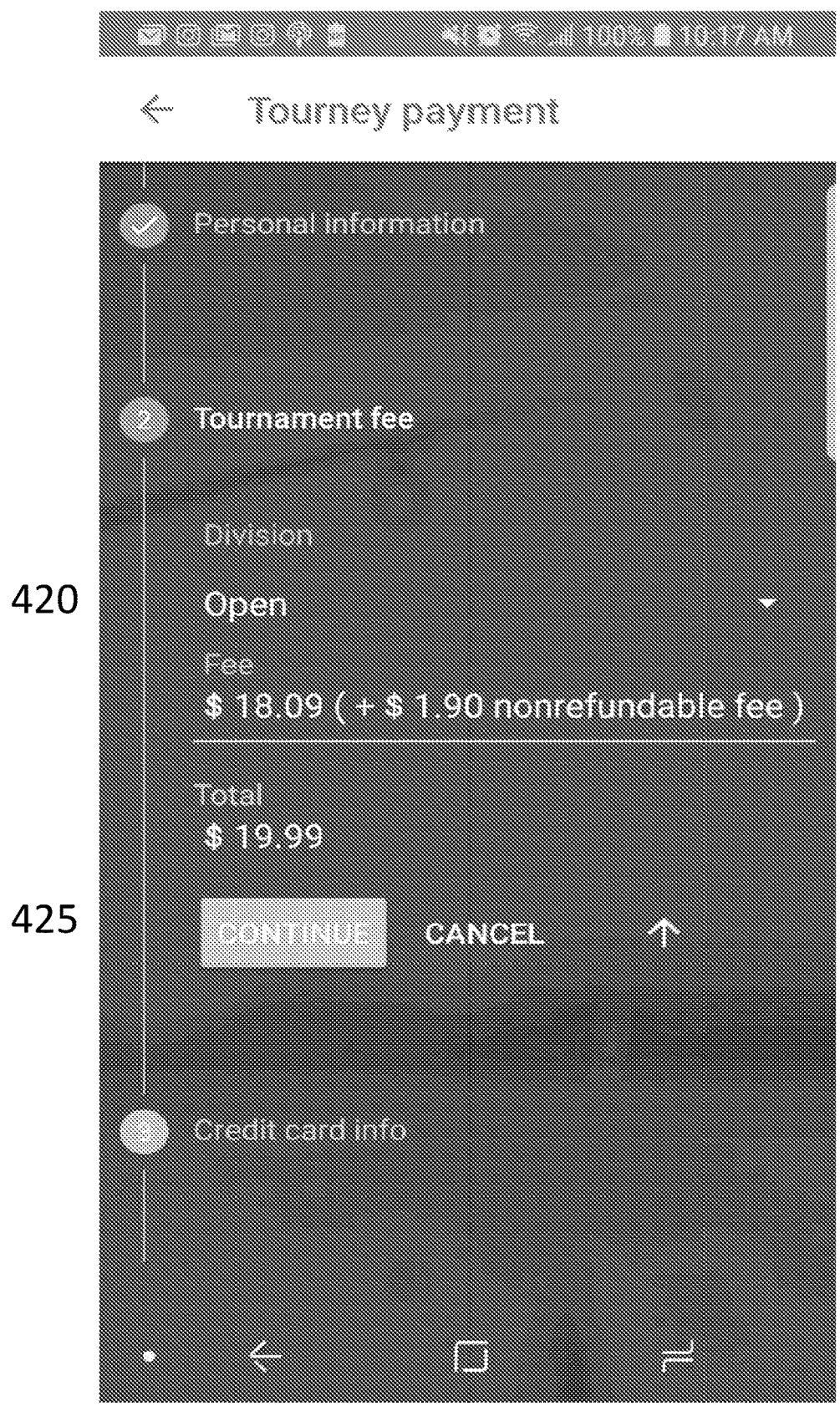
Fig. 22 – Choose Division

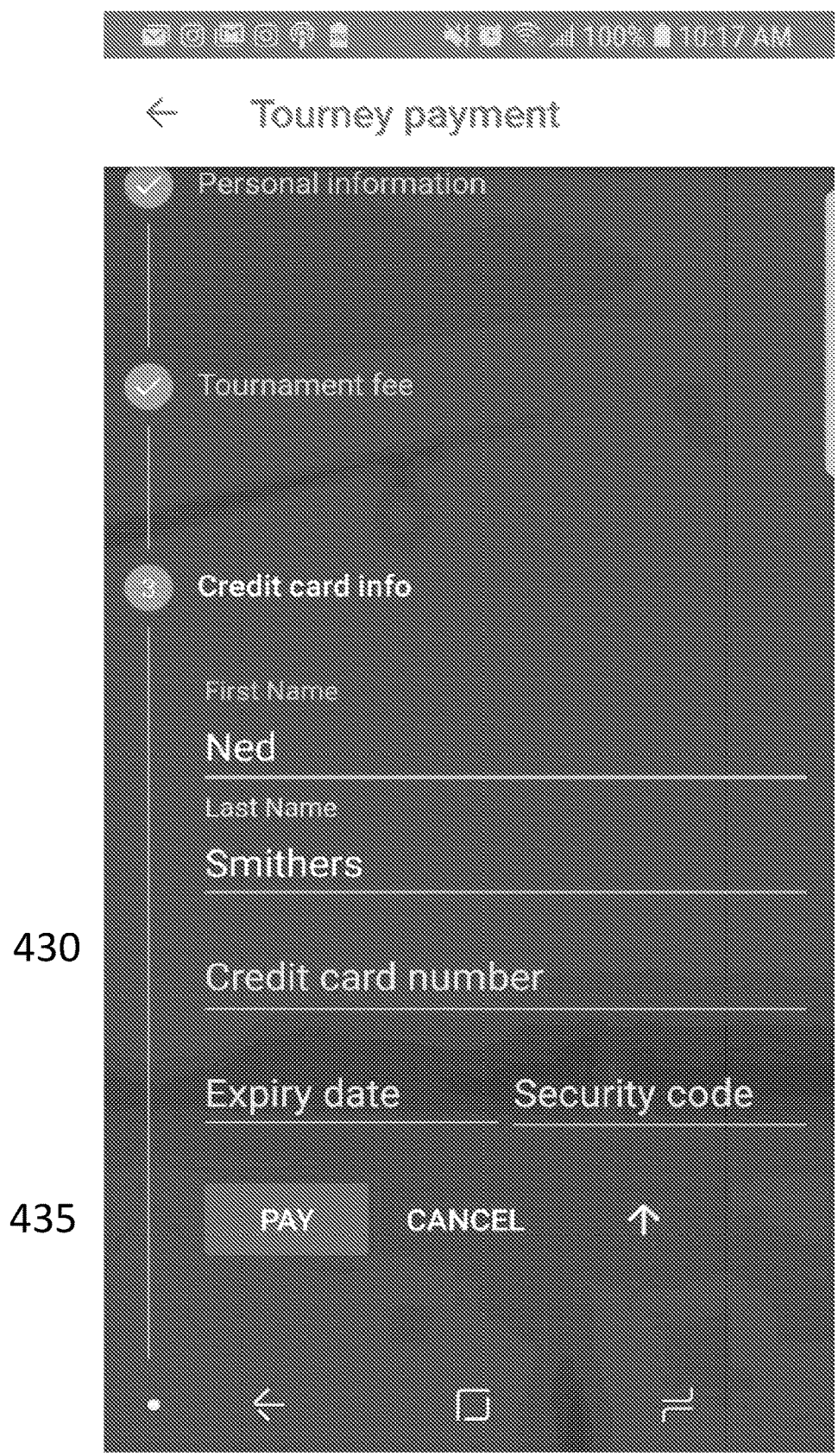
Fig. 23 – Enter Payment

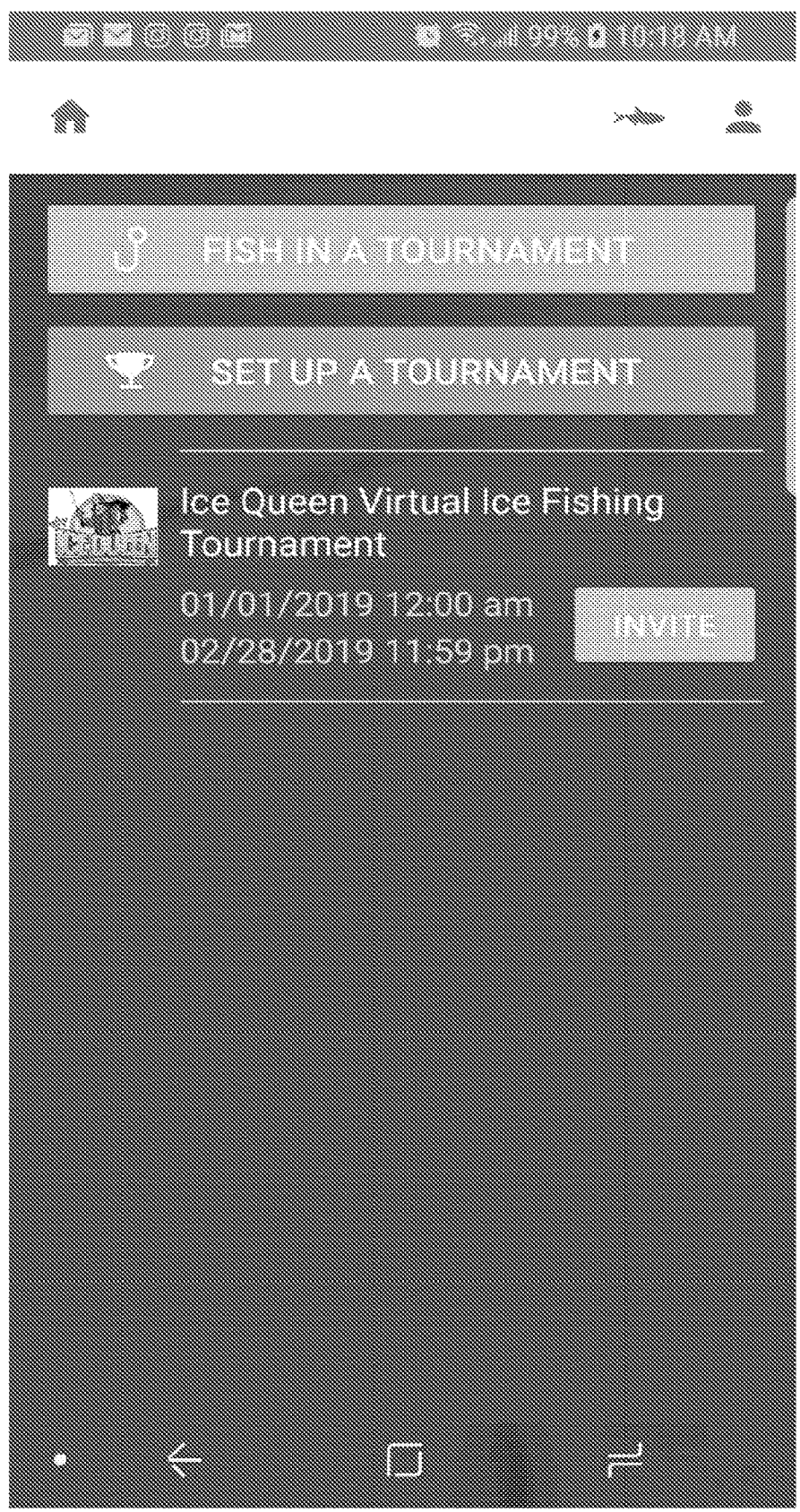
Fig. 24 – Home Screen After Joining

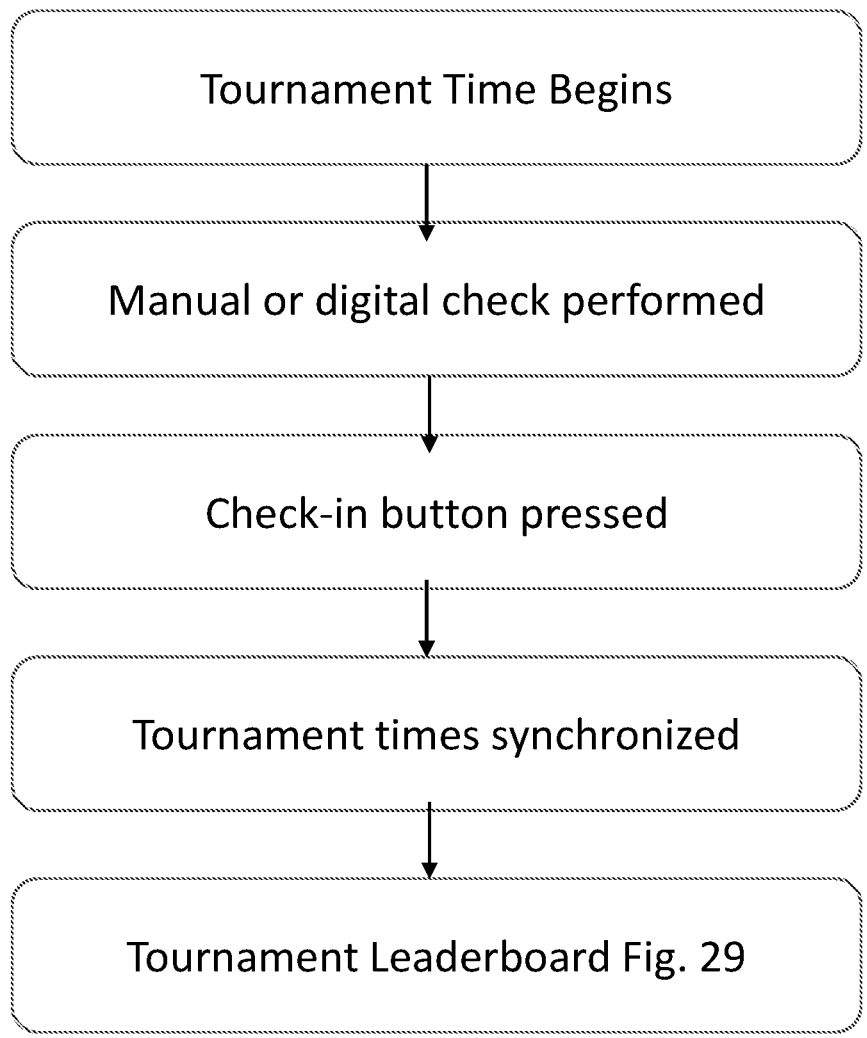
Fig. 25 – Digital Check-in Flow

Fig. 26 – Check-in

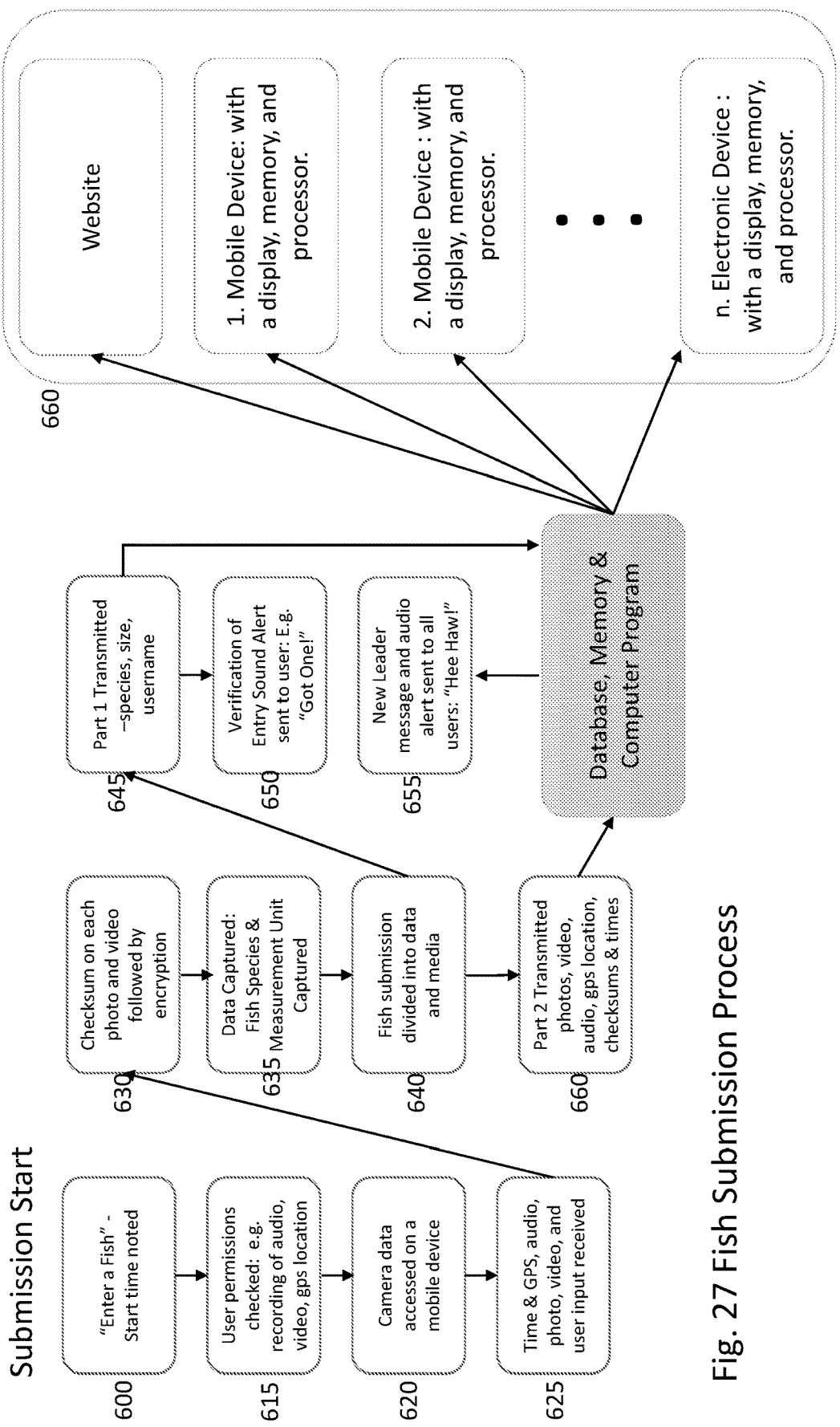
Fig. 27 Fish Submission Process

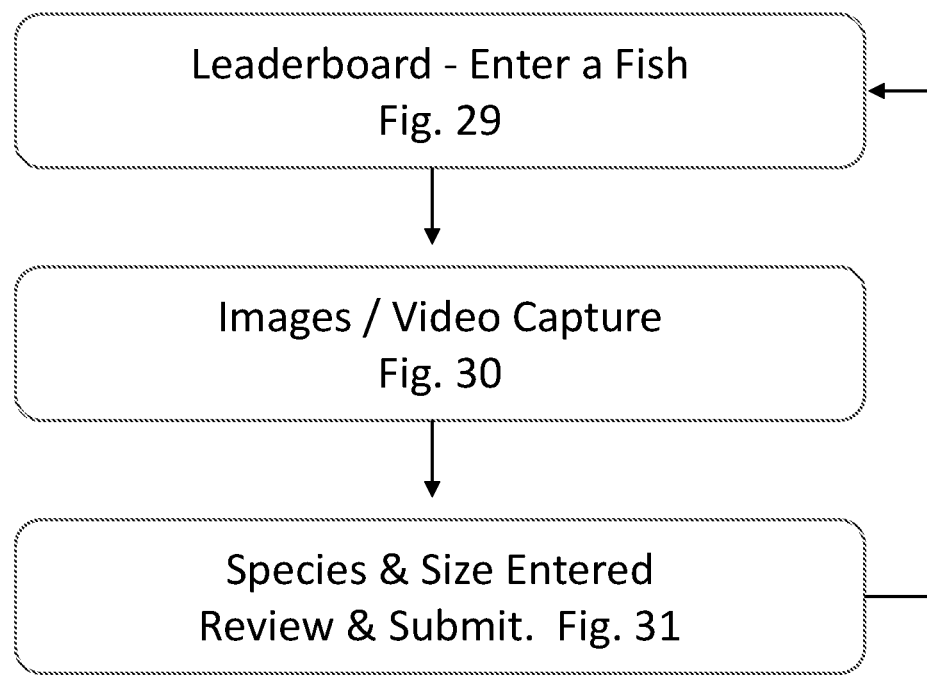
Fig. 28 – Participant Enters a Fish

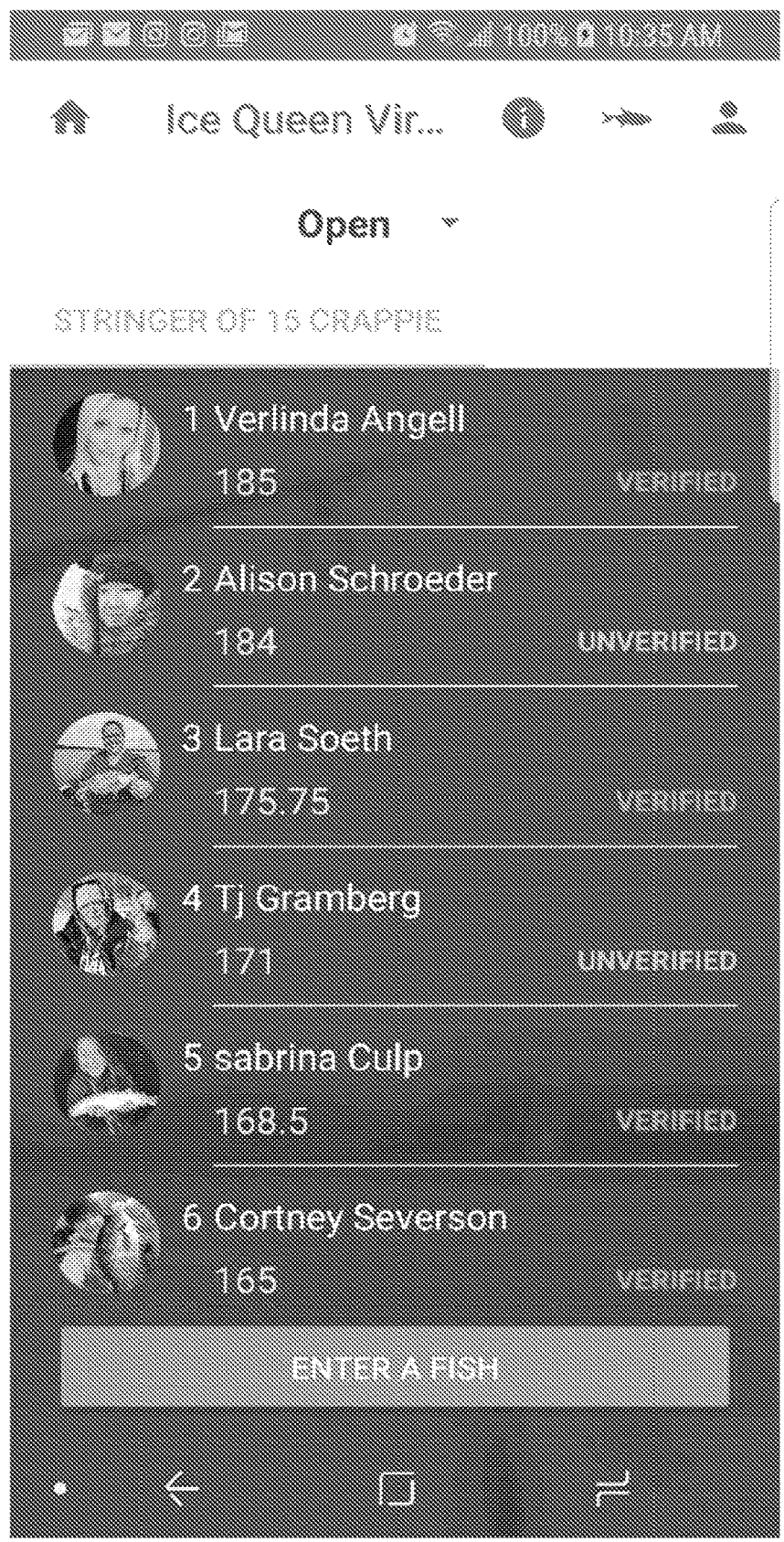
Fig. 29 – Leaderboard

Fig. 30 – Images/Video Capture

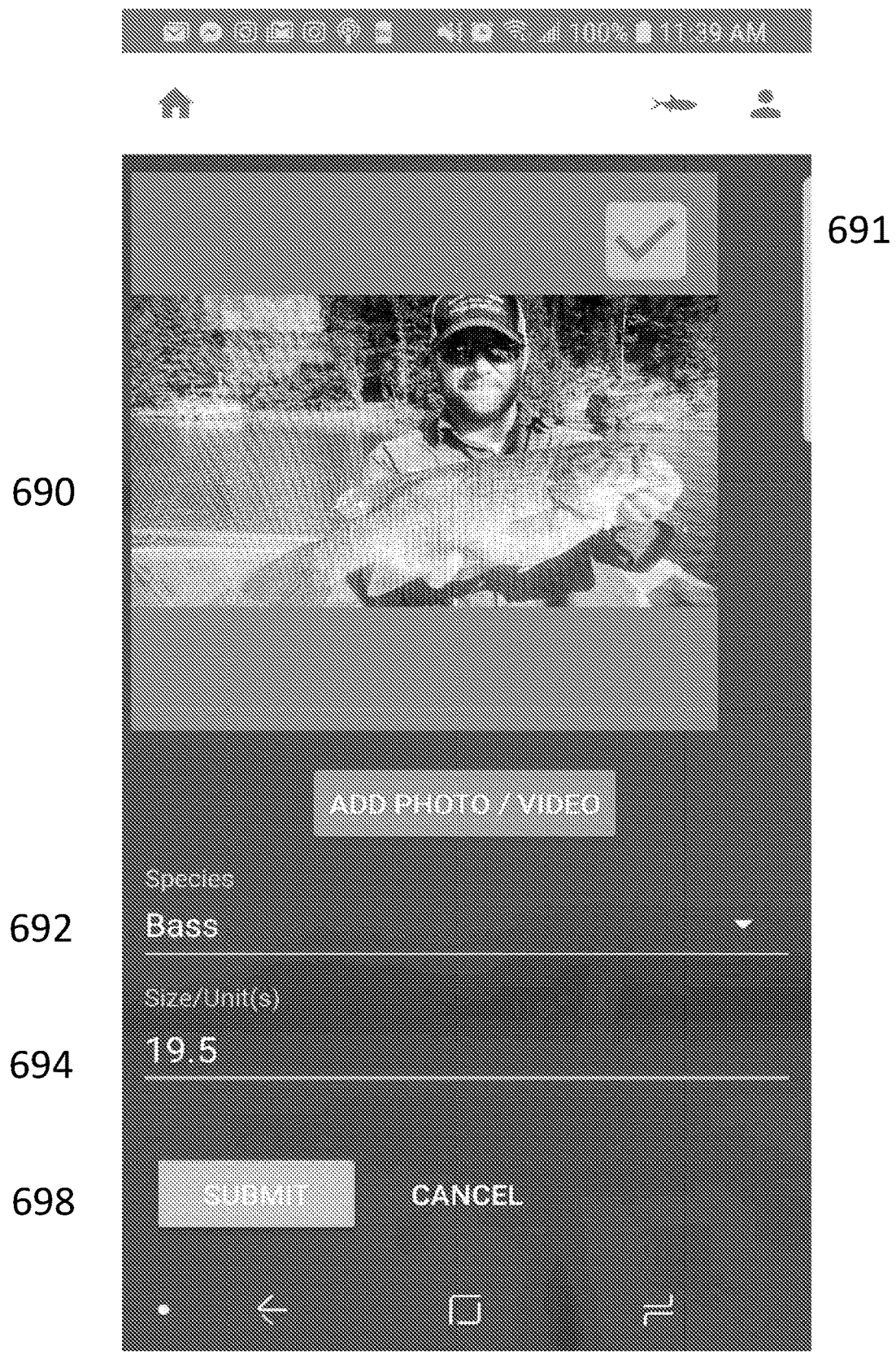
Fig. 31 – Species, Size, Submit

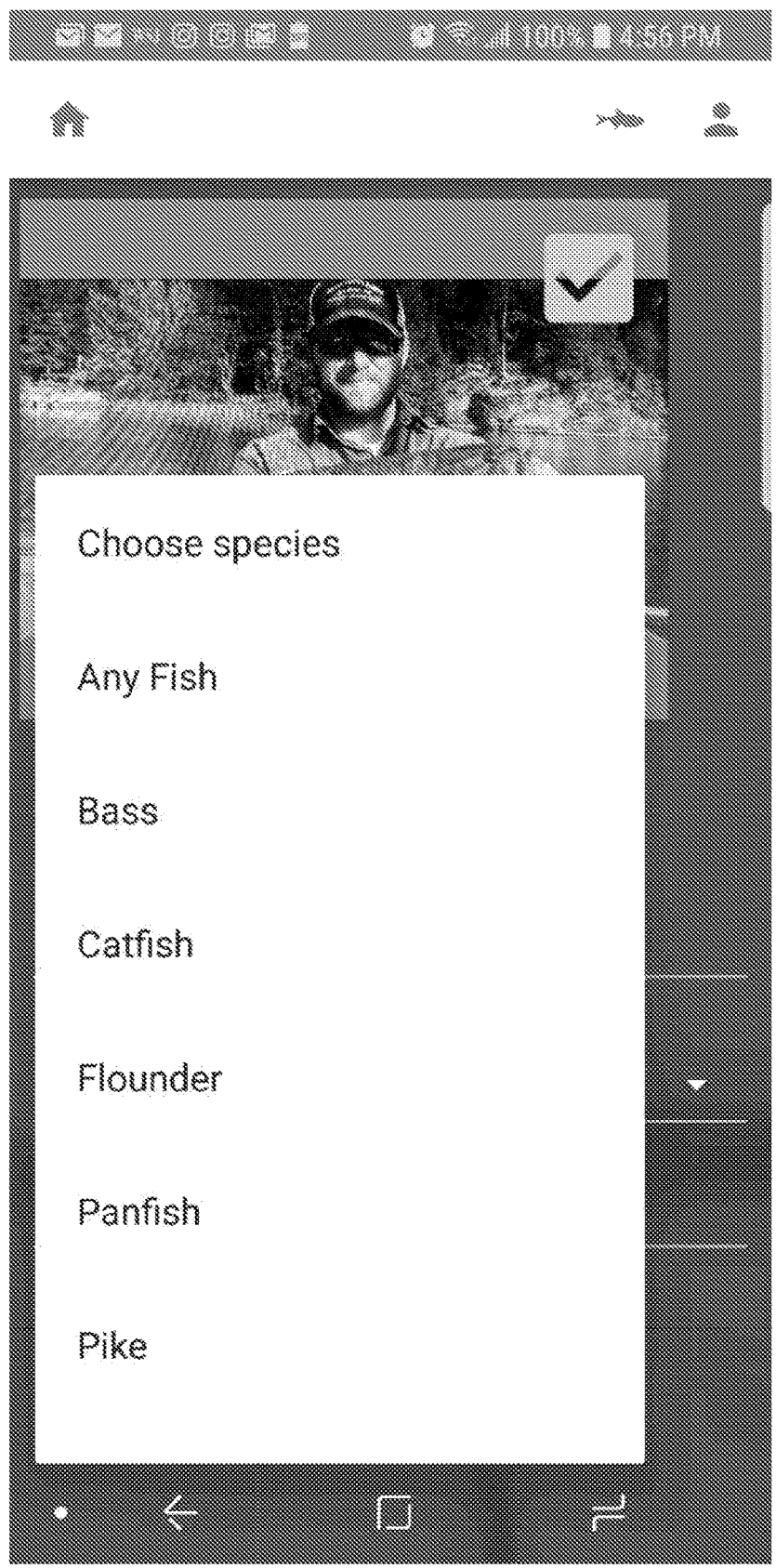
Fig. 32 – Select Species

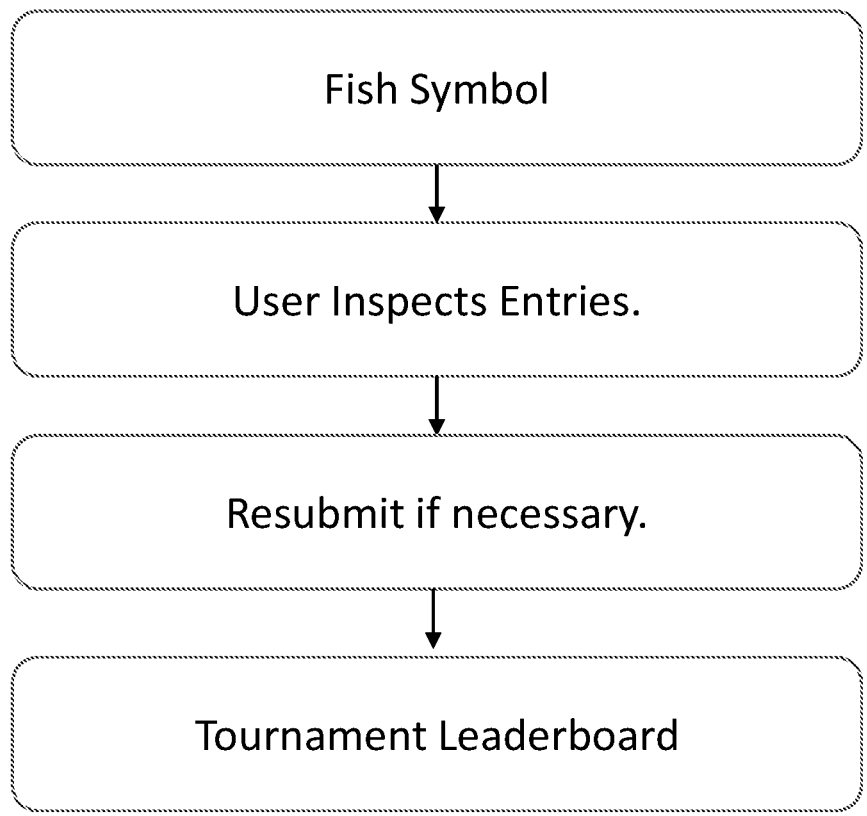
Fig. 33 – Participant Checks Entries

Fig. 34 – Fish Symbol

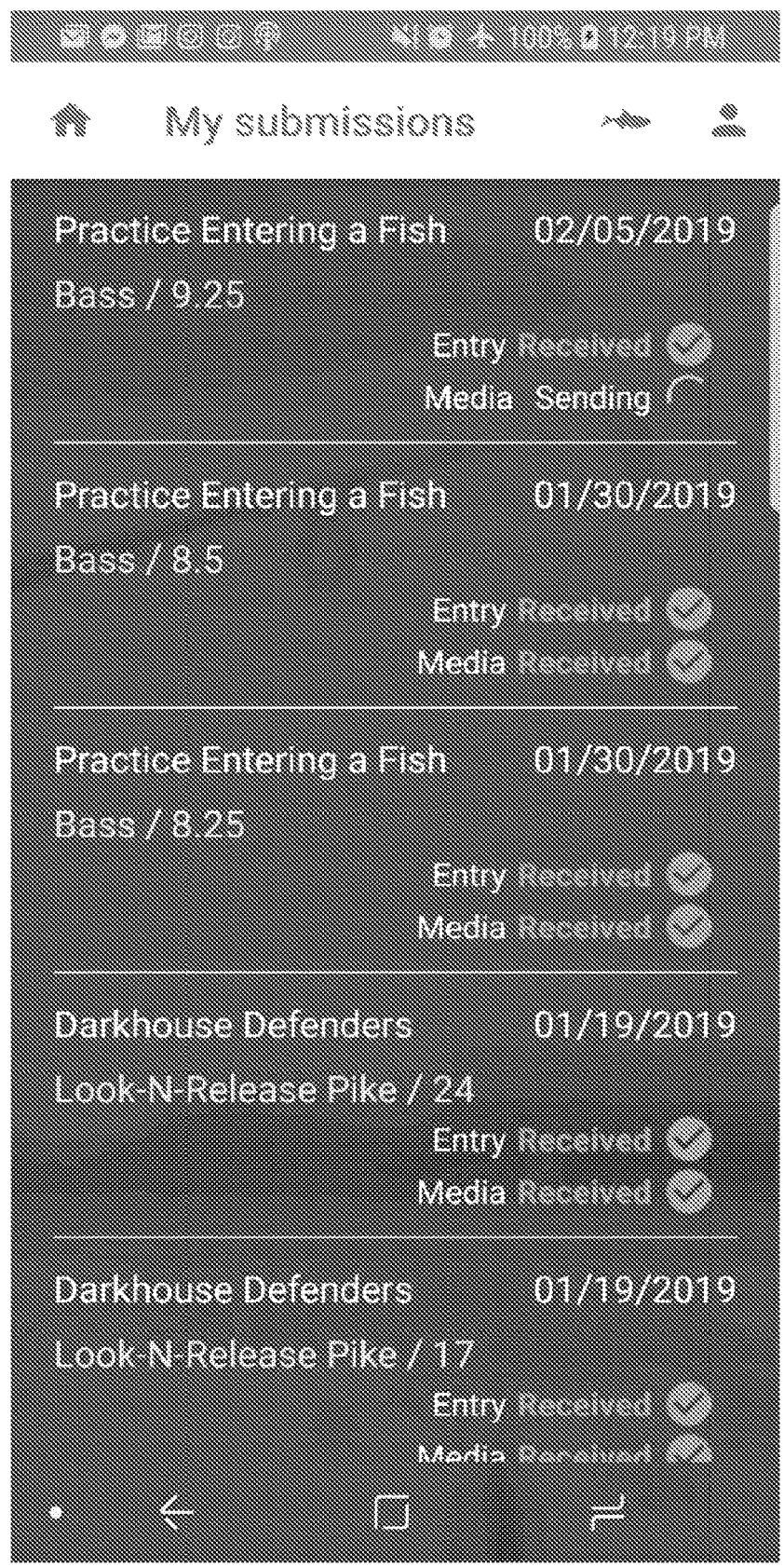
Fig. 35 – User Inspects Entries

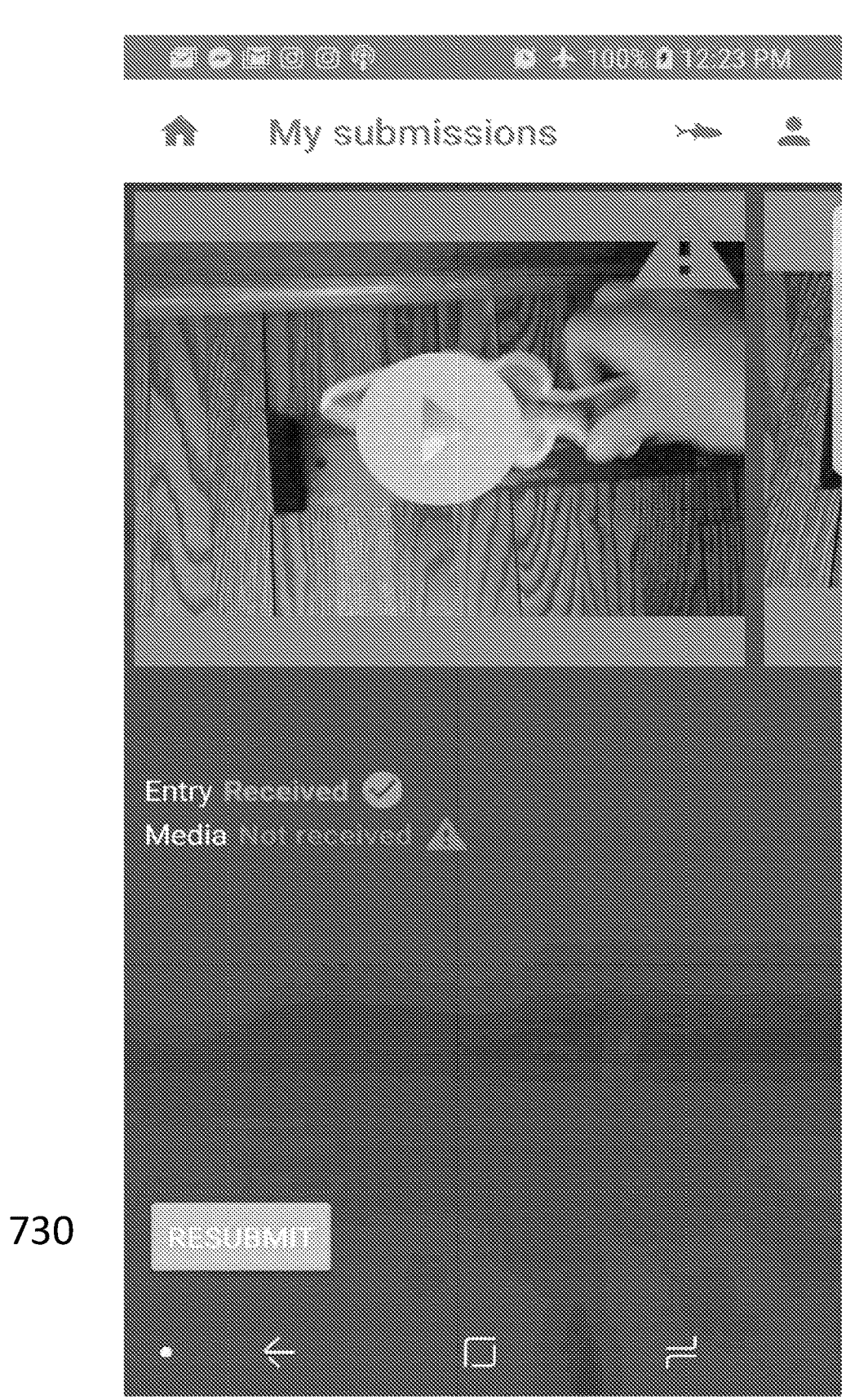
Fig. 36 – Resubmit

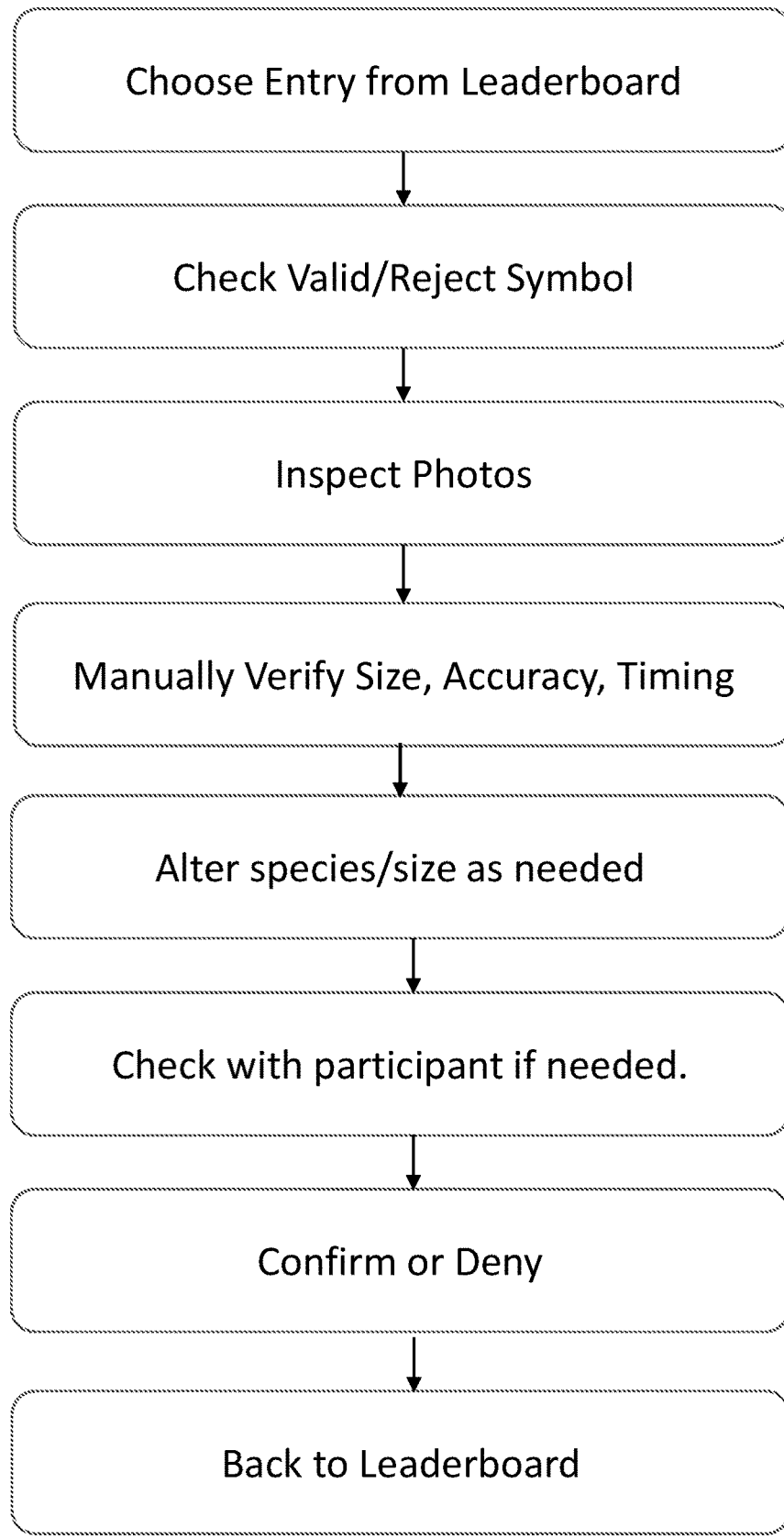
Fig. 37 – Host Verifies Submissions

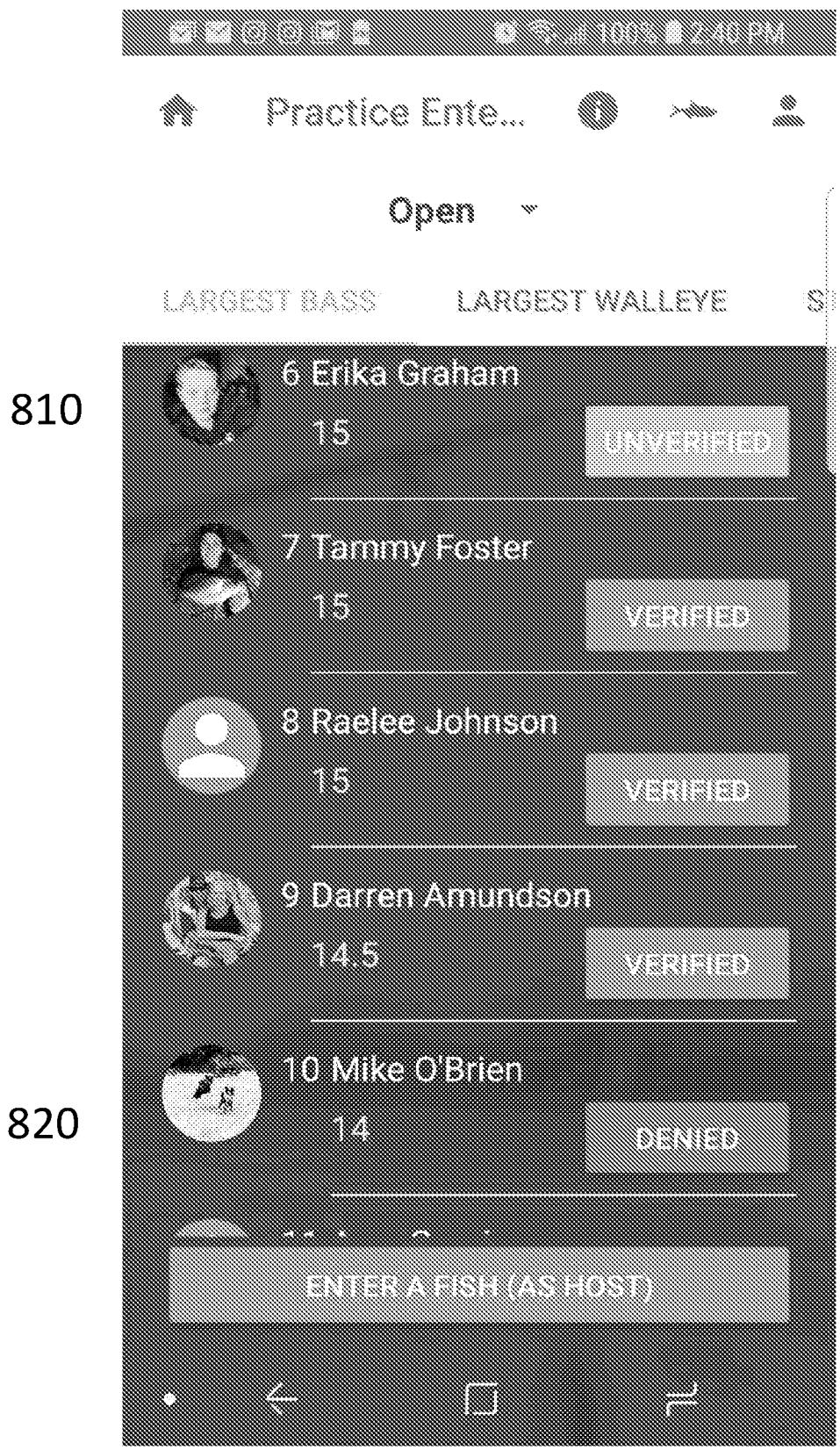
Fig. 38 – Leaderboard Status

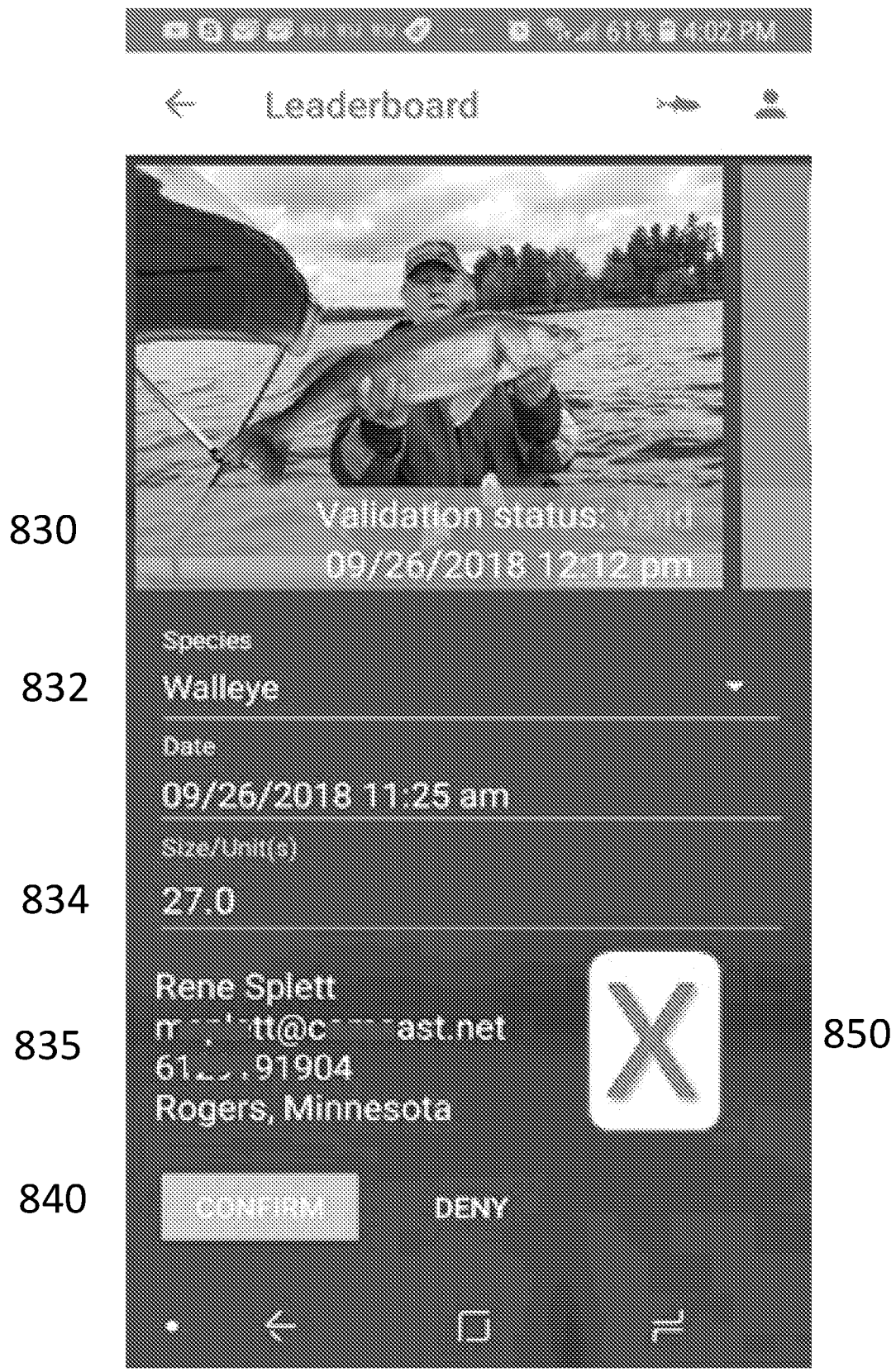
Fig. 39 – Check Valid/Reject Symbol

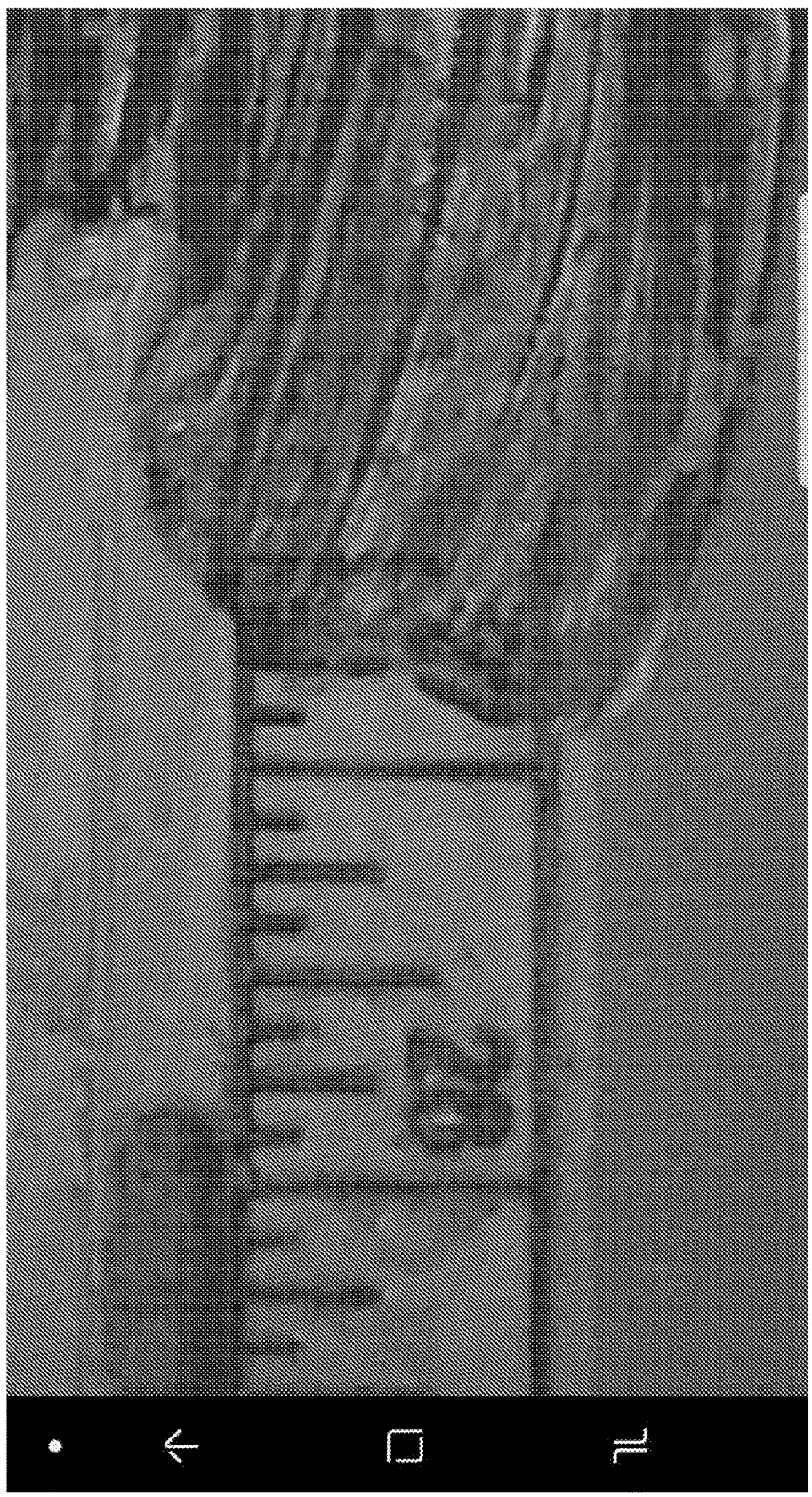
Fig. 40 – Inspect Photos

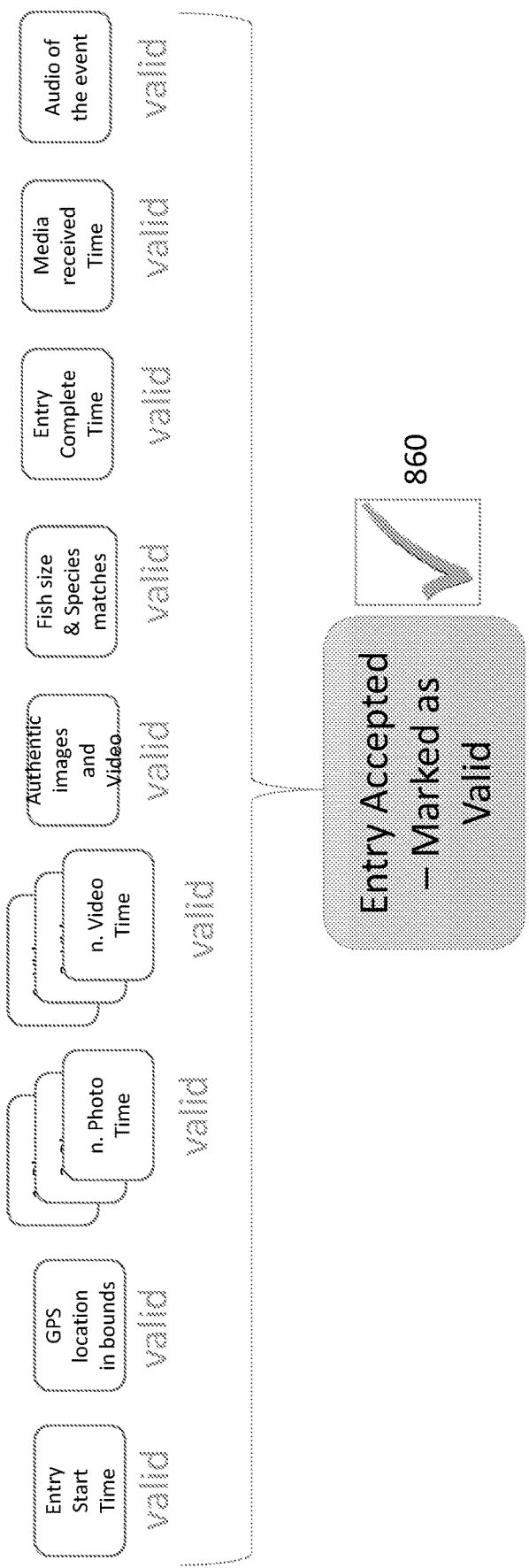
Fig. 41 – Fish Submission Valid

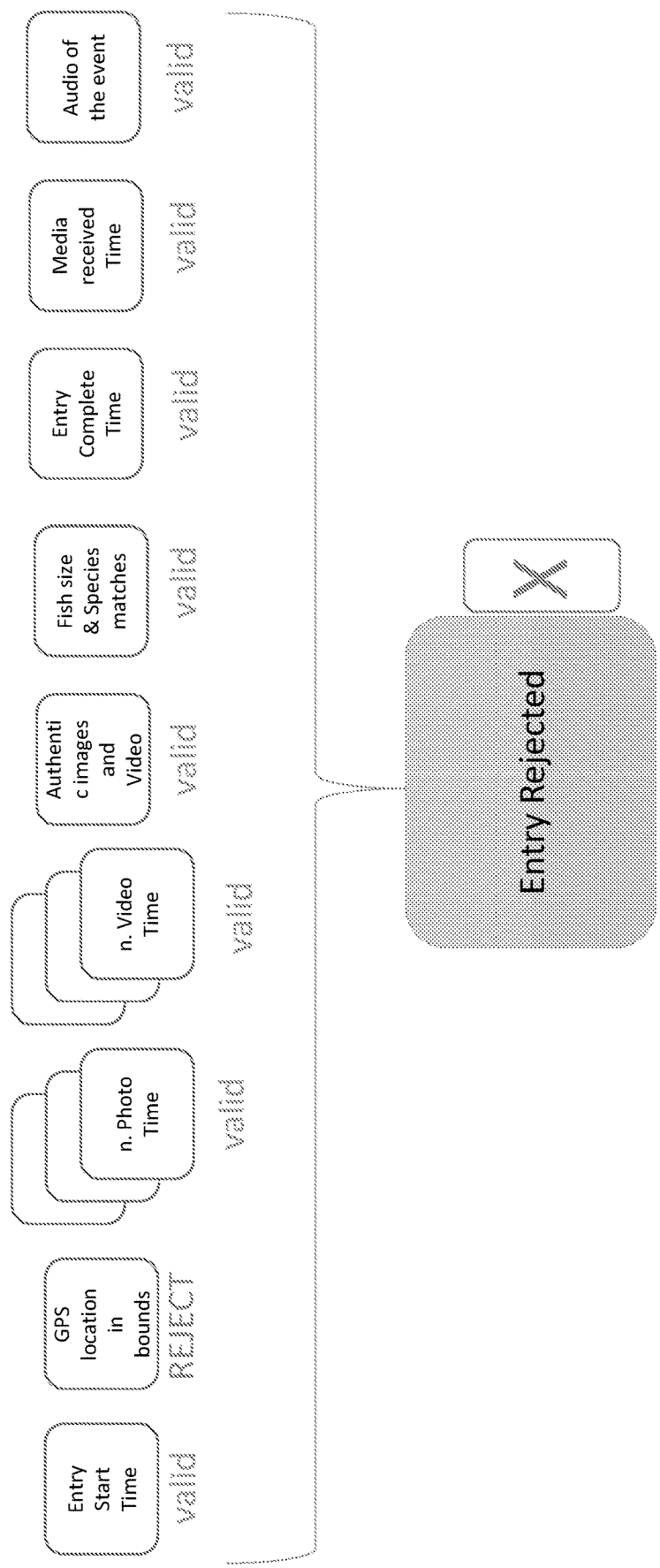
Fig. 42 – Fish Submission Rejected

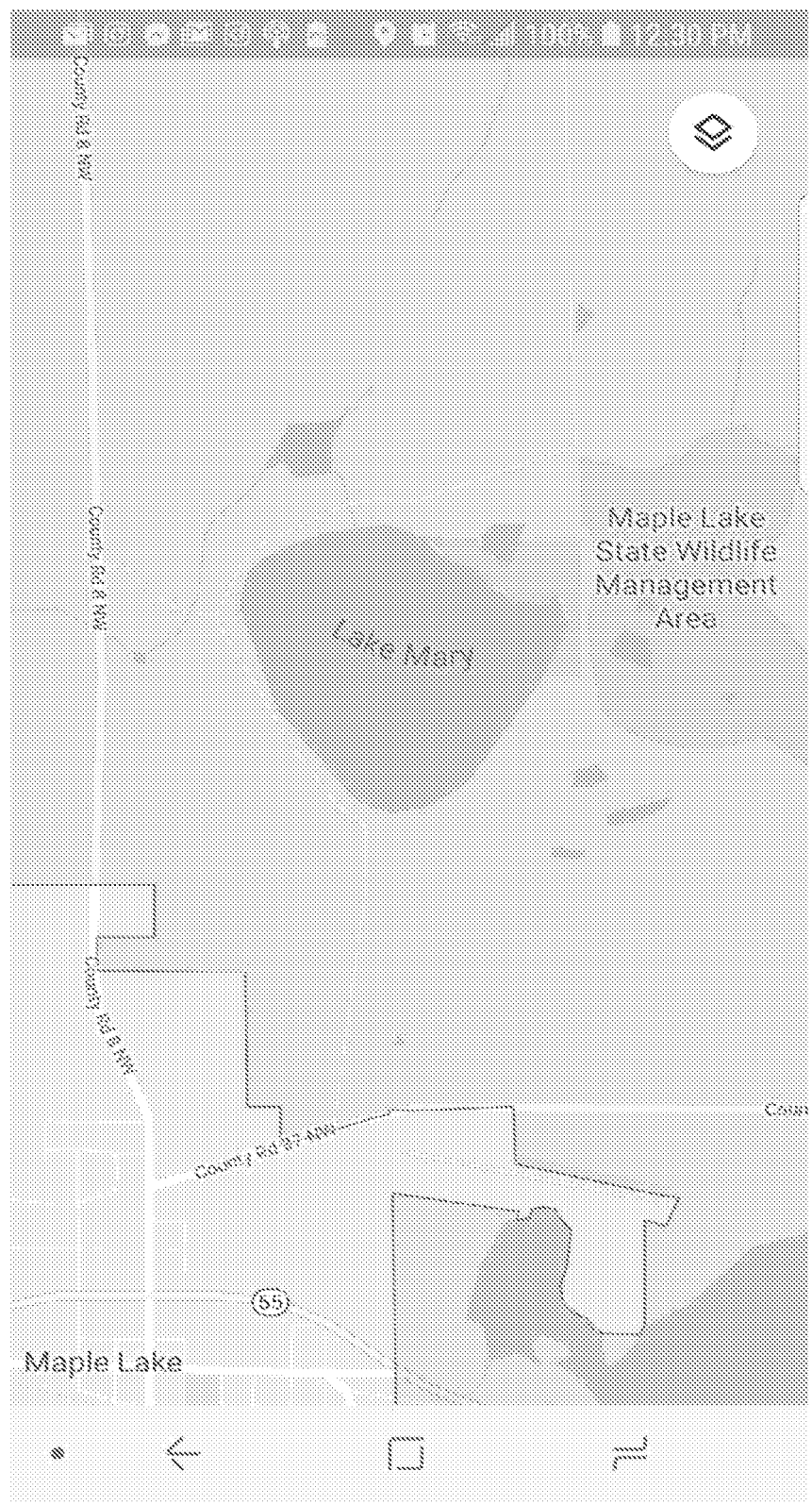
Fig. 43 – GPS Boundary Check

Fig. 44 – Lake Mary Boundary

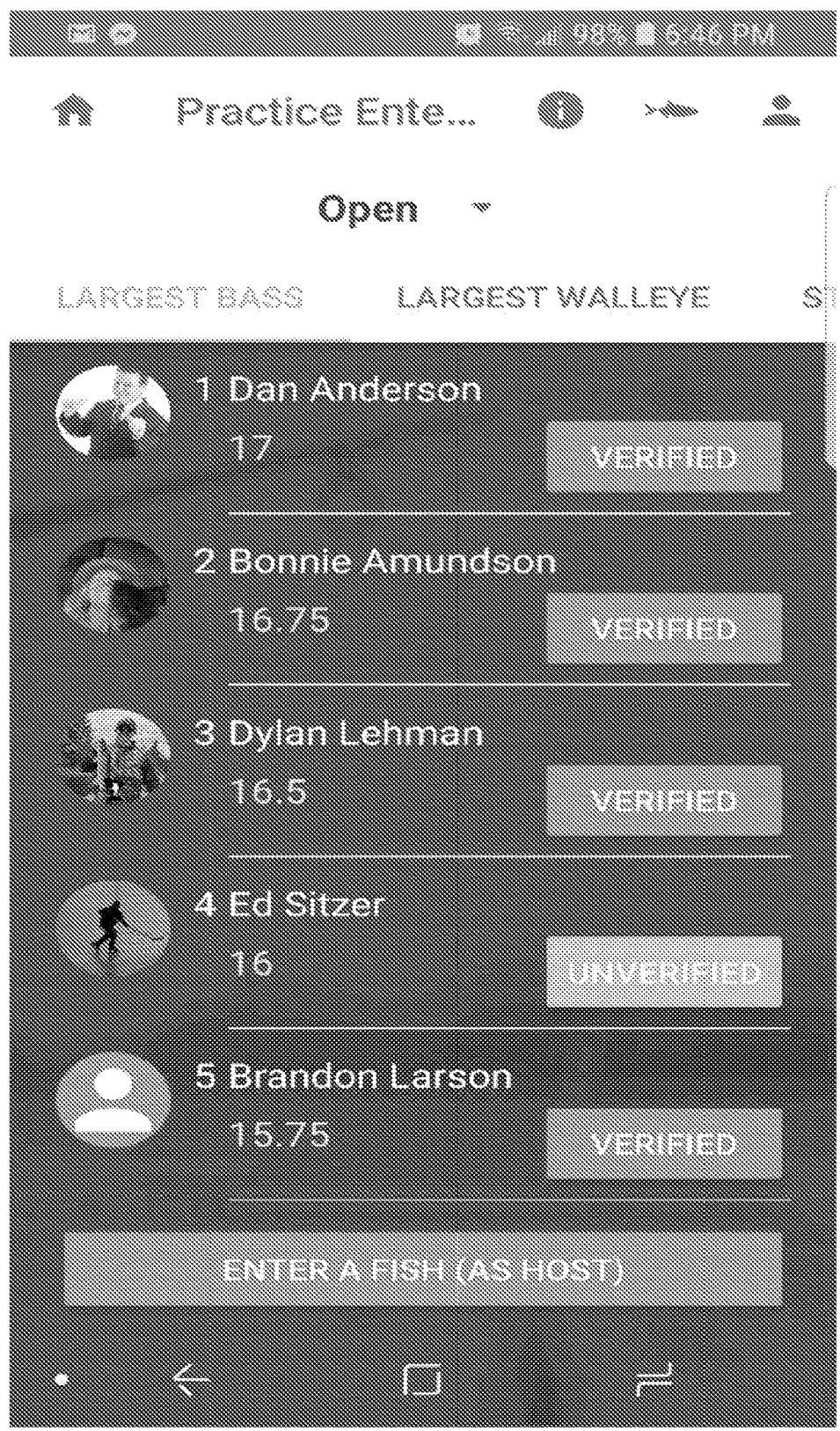
Fig. 45 – Largest Leaderboard

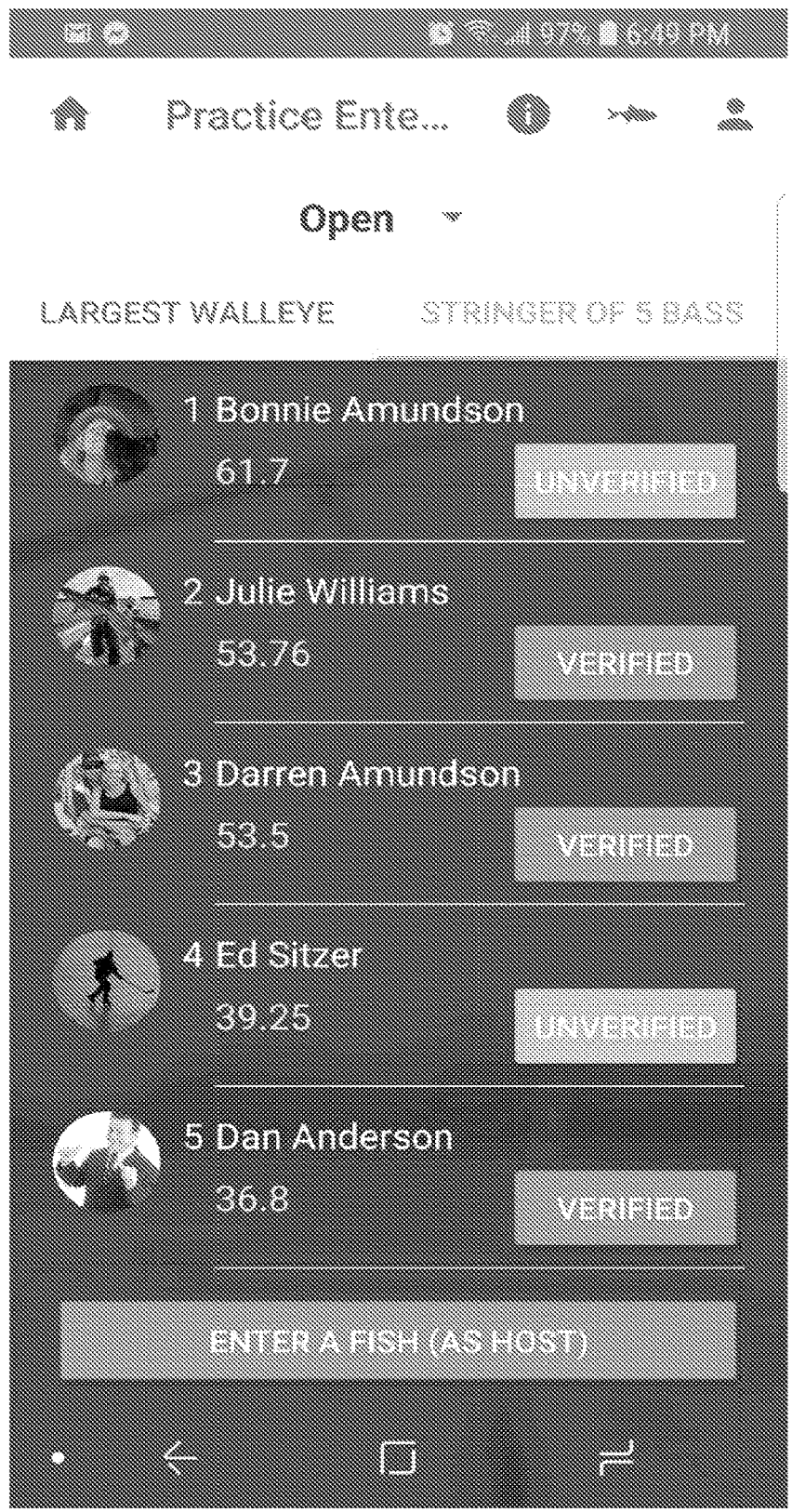
Fig. 46 – Stringer Leaderboard

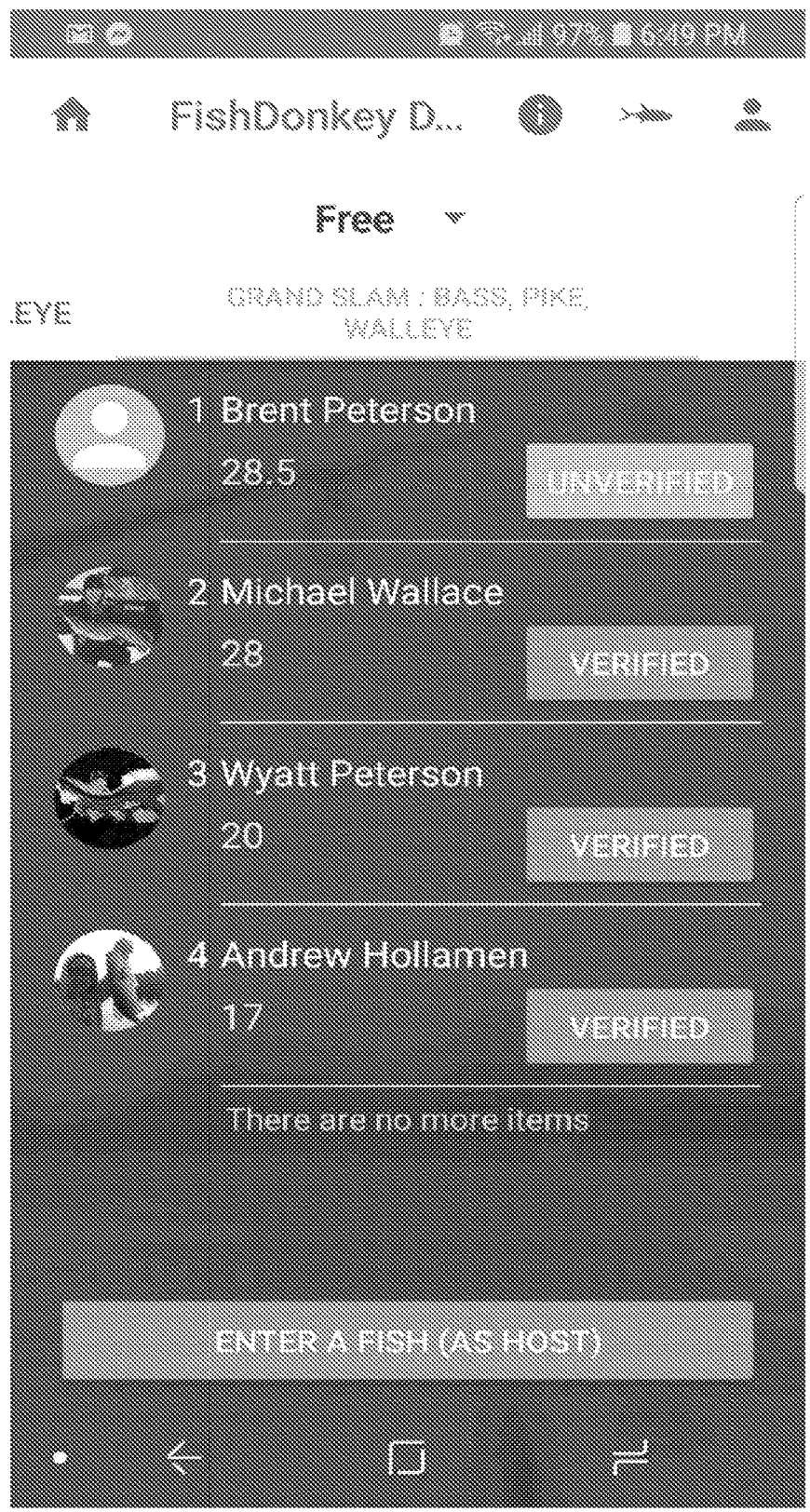
Fig. 47 – Grand Slam Leaderboard

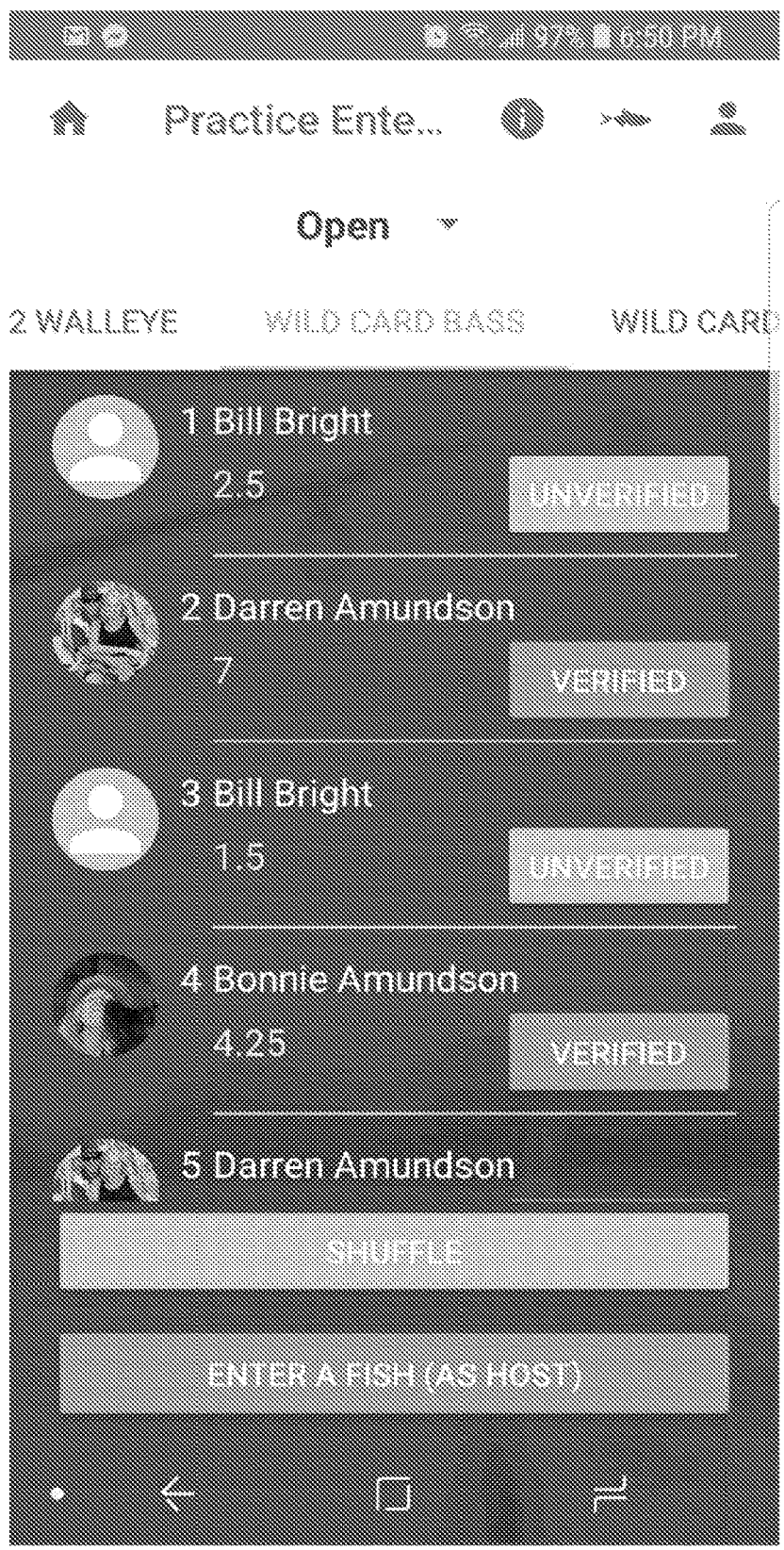
Fig. 48 – Wild Card Leaderboard

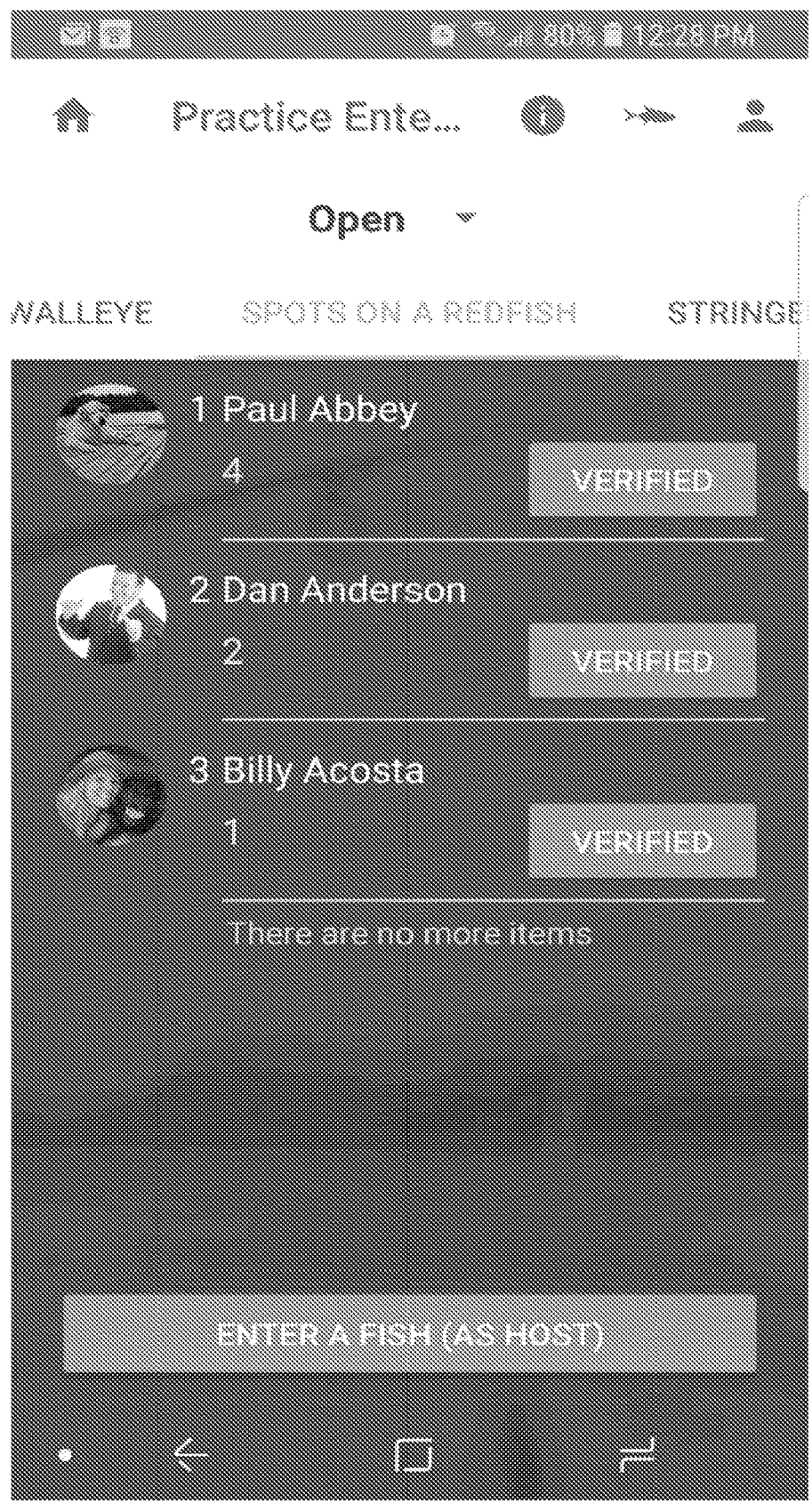
Fig. 49 – User Defined Leaderboard

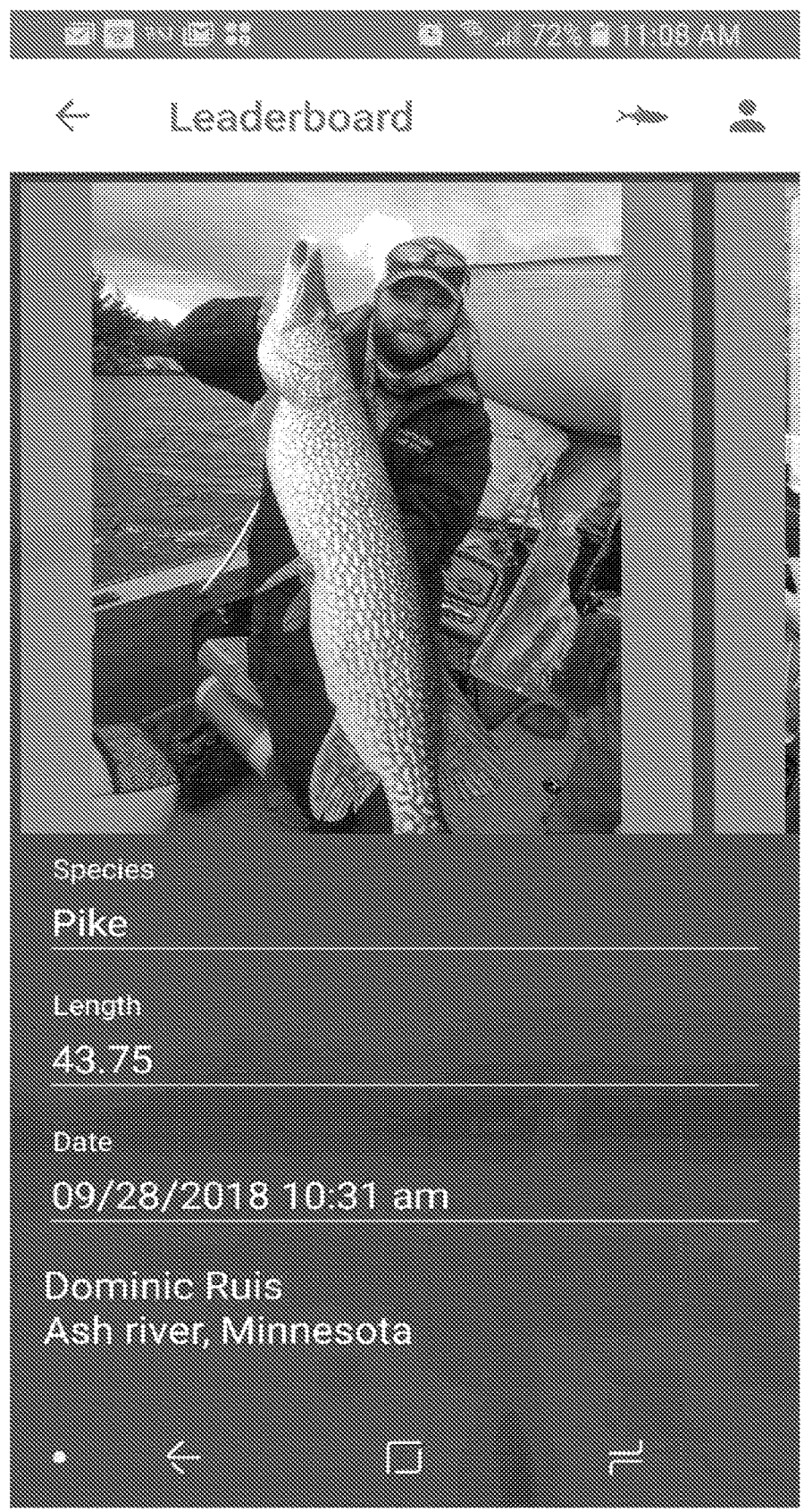
Fig. 50 – Detailed view of Leaderboard.

Fig. 51 – Participation List

FISHING TOURNAMENT PLATFORM FOR CREATING, MANAGING, JOINING, AND PARTICIPATING IN FISHING TOURNAMENTS

RELATED APPLICATIONS

This application claims the benefit of provisional patent application No. 62/628,452 filed on Feb. 9, 2018 by Andrew L. Eisenberg/Linda Clark. The provisional patent is incorporated by reference in its entirety.

TECHNICAL FIELD

This is a platform that relates to technology for fishing tournaments. More specifically the technology relates to a method, system, and processor executed software for creating, running, joining, and participating in fishing tournaments.

The following is a tabulation of some prior art that appears to be relevant:

| U.S. Pat. Nos. | Inventor | Date |
| --- | --- | --- |
| 8,478,814 | Shafter | Jul. 2, 2013 |
| 8,756,853, 9,137,977 | Davidson | Jun. 24, 2014 |
| 10,123,521 | Castaneda, et al. | Nov. 13, 2018 |
| US 10,019,773B2 | Leonard, et al. | Jul. 10, 2018 |
| 9,928,611 | Butterworth | Mar. 27, 2018 |
| 9,619,527 | Bradsher | Apr. 11, 2017 |
| 10,178,151 | Byers | Jan. 8, 2019 |
| 10,146,841 | Kass, et al. | Dec. 4, 2018 |
| 10,146,825 | Almgren | Dec. 4, 2018 |
| 10,095,877 | Stack, et al. | Apr. 11, 2017 |
| 9,507,562 | Bailey | Nov. 29, 2016 |

NONPATENT DOCUMENTS

1. TPWD Bass Tournament Mortality Study http://tpwd.texas.gov/publications/pwdpubs/media/pwd_rp_t3200_1699.pdf)
2. Digital copy of the program (Digital Copy of App) We currently have two versions available and I can send a copy of one of the versions.
   a. The easiest way to submit the software for your review might be to download it directly from Google Play (Android Phones) or the App Store (Apple iPhones)
   b. Android—https://play.google.com/store/apps/details?id=com.fishdonkey.android&hl=en
   c. Apple iOS—https://itunes.apple.com/us/app/fishdonkey/id1170550251

BACKGROUND

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Fishing contests, competitions, derbies, promotional contests, and all fishing competitions of some sort are all referred to here as fishing tournaments.

Traditionally, fishing tournaments are bad for fish. Participants catch and keep the largest fish, then transport them to a specific location for weigh-in at the end of the day. Tournament participants and organizers take care to keep the fish alive and in the best condition possible. Yet, the fish are subjected to oxygen deprivation, transportation effects, warmer water or varying water temperatures, stress, and relocation away from vital feeding grounds. Most fish are alive at the time of weigh-in, but the delayed mortality is high. Due to the above factors, studies show that the delayed (6 day) mortality can be approximately 40% and in some studies it has been even higher.

As an example of delayed mortality, one study from Texas Parks and Wildlife Division (TPWD) done in 2012 (see https://tpwd.texas.gov/publications/pwdpubs/media/pwd_rp_t3200_1699.pdf) determined that within 6 days after a traditional weigh-in tournament, 38.2% of all fish died, 44% of the larger fish died, and 100% of the largest "trophy-sized" fish died!

Some of the most popular fishing lakes have multiple tournaments on them per year and states are regulating these tournaments, requiring permits, limiting them in number, and to specific times of year. This is done to protect the fishery in those lakes.

Catch and release tournaments are better for fish. For comparison, the TPWD study from above ran a full catch and release tournament concurrently with the weigh-in tournament. The catch and release tournament resulted in a 1.5% overall delayed mortality and none of the largest fish died. This study and others confirm that releasing fish immediately results in a better survival rate and is better for fish.

There is a lot of work and organization involved in order to run a fishing tournament. The amount of planning and the number of various parties involved, makes it a full-time job to organize and run a large tournament. Numbers of volunteers are needed to manage the various aspects of the event: weigh-in, announcements, tournament registration, communications, sponsorship management, rules, food & beverage, technology such as websites and computer displays, social media coordinators, marketers, and more.

Because of the amount of work involved and the narrow geographical area covered, businesses are discouraged from running their own promotional contests. Instead, the common practice is for businesses to sponsor tournaments held by other organizers. This allows businesses to spread their brand name around a larger geographical area with less time and expense.

Modern fishing tournaments are mostly based upon fish weight and involve weigh-in stations, but fishing regulations are determined by state governments and are written mostly in inches (not by weight).

As an example of regulation in inches, the state of Minnesota regulates walleyes on Rainy Lake as follows: 4 walleyes. Walleyes from 18" to 26" inches must be immediately released. Only one walleye over 26". This means that the smaller fish under 18" can be kept. The "slot fish", which are those between 18" and 26", must be released. Additionally, one fish over 26" can be kept (oversized).

As a result of this regulation, the participants are trying to catch 4 fish as close to but just under 18" as possible. If they can get lucky and get one fish that is over 26", they are almost assured of being a leader in the tournament.

Catch and release tournaments can circumvent the length regulation issue and are better for fish. Many have been attempted, but these are ultimately a less popular alternative to traditional weigh-in tournaments. There are problems with cheating or with difficulty in the running an event where fish are not weighed at the end of the day.

One known tournament line runs catch and release contests is called the AIM Walleye Series (http://aimfishing- .com/) I found that the model hasn't spread because of some drawbacks. In order to prevent cheating, such as the submission of old photographs, they have resorted to using specific digital cameras with SD cards for each participant. Cameras with SD cards are used to photograph fish and are handed in at the measurement station at the end of the tournament in a time consuming exchange of digital images, Each image needs to be reviewed. Fish lengths are recorded on a paper sheet and then manually entered into some kind of tabulated list, where the results are sorted. This process can take hours and results in delays at the end of a tournament. Meanwhile, participants and onlookers are waiting to see who won the contest.

Tournament directors and fishing participants in catch and release style fishing tournaments have been using "control items" or a "unique identifier" such as a dated newspaper, a code, or a sticker, etc. The control item is used in order to authenticate a fish image in the tournament. If the control item is present it proves that the photo is up to date. Example of a control item is provided in FIG. 1. See King of the Cats and the "Control Item" that is being used. http://www.king-ofthecats.org/wp/?page_id=11)

A problem with control items is that you need to make and distribute them to participants. You also need to tell participants how the various control items are meant to work. You need to tell them where to place the control item or what exactly to do with it to meet requirements. The idea of using a control item to help validate a photo entered in a tournament is so prevalent that one company, TourneyTag.com, has created a line of business selling tag holders to prevent control items such as those listed above from "getting wet, lost or flying away".

There is also a problem with control items when running tournaments that have stringers or bag limits (groups of fish). An example of a stringer is a total weight of 5 bass added together in order to determine the winner. The problem with a control item in a catch and release tournament that is measuring a stringer is that it can be used to measure the same fish twice. Even if a close examination of photos can prove it is the exact same fish, the participant might claim that they unknowingly caught it twice.

Yet another problem with using a control item is that modern software like photoshop does a very good job of altering photos and might not be detectable by the organizers.

U.S. Pat. No. 9,582,843 by Leonard, Feb. 28, 2017 and U.S. Pat. No. 10,095,877 discuss "systems and methods for authenticating photographic image data". These patents appear to be relevant but fall short of being usable for fish submissions in a tournament. The main focus of such patents appears to be in attempting to prevent alterations to a photo and authenticating individual photos.

U.S. Pat. No. 9,137,977B2 attempts to address the control item problem by using a lure with a unique serial number to collect data. It involves a lure with technology inside it that serves as the "control item". It comes at an extra cost and complexity. There is a cost to creating the lures, distributing them, and then there is the additional time and effort involved in explaining the lure to participants.

Another U.S. Pat. No. 8,478,814 from Shafter Jul. 2, 2013 details a "method and system for remotely directing a fishing tournament" also uses a code in order to validate the authenticity of an image. I have discovered additional problems with U.S. Pat. No. 8,478,814 that include a reliance on the use of the internet, which is a problem because the best fishing spots are often not within reach of a network. Another weakness of the web centric nature of U.S. Pat. No. 8,478,814 (shafter) is that the tournament director records the information about the tournament at the "end" of the contest.

Thousands of fishing tournaments take place each year across the United States. In Minnesota alone, there were approximately 104,000 participations in state permit issued fishing tournaments in 2015. These permitted tournaments are mostly single-day, local events. Multi-day tournaments and tournaments that cover a larger geographical area with multiple lakes are less common than localized single day events. This is because it is typically difficult to run a tournament that covers longer periods of time. Problems include the need to monitor and measure the fish, the delayed mortality caused by transporting fish, and the lack of a way to efficiently manage a tournament over longer periods of time.

SUMMARY

This is a fishing tournament platform that helps users create and run or join and participate in fishing tournaments. Traditional fishing tournaments focus mostly on single species or geographically restricted events with end of tournament "weigh-ins". Our platform uses new techniques for configuration and for photo validation that makes it possible to not only run traditional tournaments more easily, but also to run new types of tournaments that were not even possible before. These new tournaments don't need to follow the normal boundaries of time and geography. The platform allows the general public to be able to create and operate their own fishing tournaments and to do so in a way that is better for fish.

The platform includes an application that allows interaction between mobile electronic devices, a server system with computer software, a database, and leaderboards displayed on mobile devices, on a website, or on another electronic device or computer.

The platform has some new features like using a tournament application to make fish entries and prevent cheating. The platform provides a simplified fish verification process for tournament hosts. It has the ability to work in areas with little or no network coverage and it enables anyone with a mobile device or a computer to create and run a fishing tournament. The platform also uses GPS location and time indicators in a new way.

The tournament creation process is flexible enough to allow users to create new types of tournaments. These new tournaments come with leaderboards that are updated throughout the contest and features like text notifications and sounds that play when there is a new leader.

Advantages:
1. Tournament fishing is possible on a mobile device: Our software makes it possible to create, manage, join, and participate in fishing tournaments on a mobile device.
2. Rehosting an annual tournament is easy: The tournament platform makes it easy to rehost a tournament that has already been created.
3. New styles of tournaments are possible: The flexibility of this platform makes it possible to create complex multi-species tournaments with new boundaries of geography and time.
4. Promotional tournaments are more feasible: The process of running a tournament is automated, less time consuming, and easier to run. Businesses can run longer contests over wider areas, exposing their brand to a larger pool of participants.

5. Removes the need for a control item: Previous tournaments had a need for a control item or a need to prevent and check for alterations in photos that came from various devices. This platform uses a mobile device running a client-side tournament application (a trusted source) with cheating prevention for acquiring media used in fish submissions.
6. Easy to Enter a Fish: The design allows for a complex, multi-species contest to be organized while keeping the process of entering a fish as simple as if it were a single species tournament.
7. Verify Submissions for Host: The platform uses technology to help tournament judges verify fish submissions. Times, locations, photos, videos, audio and all data associated with a fish submission are included in a single tool for verifying fish submissions.
8. Live Leaderboards: Observers and participants don't have to wait until the end of the tournament to see who is winning. Entries come in throughout the tournament and not at the end of the day.
9. Works without Internet or Network: Our platform has the ability to work in poor network areas and in areas with no access.
10. Leaderboard notifications: Sounds that indicate new leaders on a leaderboard add to the excitement.
11. Ease of Starting a Tournament: The placement of two buttons (one for creating, one for participating) has resulted in increased awareness by participants. After participating, user can easily try starting their own tournament.
12. Flexibility of Units: Our system allow tournaments to measure fish by weight or by length.
13. Avoids "slot fish" regulations: Our system allows all fish to be entered into a tournament even the "slot fish", since the fish are immediately released.
14. Easy Check that Participant is in a defined boundary: Our system warns tournament judges if a participant catches fish from an area that is out of bounds.
15. Unconstrained by normal time limits: The platform makes it just as easy to run a month long tournament as it is to run a single day tournament.
16. Easier to Run: Time for running a tournament and verifying the end results are greatly reduced. The platform automates the exchange of digital media, the authenticity of photos, the entering and sorting of results.
17. Fewer results to verify: With our platform, not all results need to be verified. The leaderboards are pre-sorted by the software and so fewer results need to be checked, because only the winners need to be verified.
18. Some incentives to cheat are eliminated: The platform addresses different forms of cheating and mitigates those problems.
19. It's better for fish: This platform makes it possible to run tournaments that are better for fish.

LIST OF FIGURES & SUB-FIGURES

FIG. 1 Control item (Prior Art)
FIG. 2 Platform Overview
FIG. 3 Home Screen
FIG. 4 User Profile
FIG. 5 Personal Information
FIG. 6 Setting up a Tournament
FIG. 7 Contact Information
FIG. 8 Tournament Information
FIG. 9 Divisions & Fees
FIG. 10 Species
FIG. 11 Category Selection
FIG. 12 Wild Card
FIG. 13 Categories
FIG. 14 Summary
FIG. 15 Rehost Screen
FIG. 16 Tournament Created
FIG. 17 Join a Tournament
FIG. 18 Joinable List
FIG. 19 Identify Tournament
FIG. 20 Personal Information
FIG. 21 Team Fishing
FIG. 22 Choose Division
FIG. 23 Enter Payment
FIG. 24 Home Screen After Joining
FIG. 25 Digital Check-in Flow
FIG. 26 Check-in
FIG. 27 The Fish Submission Process
FIG. 28 Participant Enters a Fish
FIG. 29 Leaderboard
FIG. 30 Images/Video Capture
FIG. 31 Species, Size, Submit
FIG. 32 Select Species
FIG. 33 Participant Checks Entries
FIG. 34 Fish Symbol
FIG. 35 User Inspects Entries
FIG. 36 Resubmit
FIG. 37 Host Verifies Submissions
FIG. 38 Leaderboard Status
FIG. 39 Check Valid/Reject Symbol
FIG. 40 Inspect Photo
FIG. 41 Fish Submission Valid
FIG. 42 Fish Submission Rejected
FIG. 43 GPS Boundary Check
FIG. 44 Lake Mary Boundary
FIG. 45 Largest Leaderboard
FIG. 46 Stringer Leaderboard
FIG. 47 Grand Slam Leaderboard
FIG. 48 Wild Card Leaderboard
FIG. 49 User Defined Leaderboard
FIG. 50 Detailed View of Leaderboard
FIG. 51 Participation List

DESCRIPTION

This is a fishing tournament platform consisting of a tournament application running client-side on mobile electronic devices, a method, a system, and a processor-executed software engine for creating, managing, joining, and participating in fishing tournaments.

The electronic device that most participants are using is a smartphone, but in other embodiments the device for participating could also be a smart camera, a tablet, a smart watch or other smart jewelry, smart glasses, a video camera, a laptop or notebook, an electronic boating device, or any electronic device that includes but is not limited to a memory, processor, camera, audio, a speaker, microphone, video, & gps abilities that can run a processor-executed software application. For convenience the device will be referred to as a mobile device and in the embodiment described, the mobile device is a mobile phone.

Client-side programming resides in the memory of the mobile device and varies between different devices in order to accommodate different features of various devices made by different manufacturers. E.g. Mobile devices from Android or Apple.

Higher Level Overview

In FIG. 2 the system is shown at a high level to be any number of mobile devices with a running tournament application and the ability to interact over a network with a tournament engine that is running servers and databases, computer programs, collecting data and media, performing checks and calculations, sorting and updating results, and providing an interface for other mobile devices to access and display results such as leaderboards.

The results might be pushed out to the mobile device or the mobile device might request an update from the tournament engine. The mobile devices both send and receive data from the tournament engine. In some instances, the mobile devices will further process the results or display them on another device or a website.

Description of the Home Screen

Users register for and create an account through their mobile device or through Facebook.

Shown in FIG. 3, the tournament application opens to a home screen that has a home icon 200, a fish icon 210, and a profile icon 220, a FISH IN A TOURNAMENT button 230, and a SET UP A TOURNAMENT button 240.

The FISH IN A TOURNAMENT button 220 allows a user to find a tournament, join it, and participate in it. The SET UP A TOURNAMENT button 240 allows the user to create and manage a tournament.

These proximity of these two buttons, one for joining a tournament and the other for creating a tournament, right next to each other, is the first thing a user sees when they log on for the first time. Because the two buttons are right next to each other, the user is notified and easily made aware that the platform is not only for participating, but also for creating tournaments. On the home screen there is a blank space 250. This space contains links to a user's tournaments, but a new user does not yet belong to any tournaments so this space is blank. The placement of the buttons next to each other on an empty screen makes an instant impact on the user. The result is that the platform has more new tournaments created, then if these two buttons were not placed in such a manner as in FIG. 3.

In other embodiments, the buttons 220 and 240 could have a different text or style of notification.

Selecting button 220 opens the user's profile. FIG. 4 shows the profile information, which contains personal information, profile photo, password, and settings that can be edited. FIG. 5 shows personal information such as email address, phone number, and location.

Overview of Creating a Tournament

Process FIG. 6 provides an overview and flow chart of the tournament creation process. started. The first step is gathering the tournament contact Information. This is pulled from the user profile and it can be edited. The contact listed here will be the contact person for the tournament and the information will be a part of the tournament description after it has been created.

After gathering the contact information, the tournament name, time and location are entered. The host can name specific bodies of water or multiple bodies of water here.

Tournament divisions and fees are decided next. The tournament needs at least one division. Divisions are separately tracked tournaments within a tournament, such as a division for veterans, children under 16, senior citizens, participants limited to fishing from a kayak, participants limited to fishing from shore, etc. Divisions are exclusive in that a participant can only belong to one division.

Any number of user definable divisions can be created and each division is associated with a fee that will be paid by a participant who joins the tournament. Each division can have its own fee or they can all have the same fee. An example is a tournament that has an adult division for $50 and a youth division for $10.

After adding the desired divisions, the user begins entering the fish species and prize categories that they would like to have in their tournament. The species that are entered are the names of the fish species that the fishing participants will later use to enter their fish. The fishing participant will pick the named species off of a dropdown list. See FIG. 32.

The categories created are leaderboard categories that the host wants to measure in their tournament. The category names will make up the leaderboard names for the tournament, so the user needs to keep this in mind as they create the categories. Each leaderboard category will become a leaderboard heading and fish entries coming from a data feed from the centralized server will be displayed below it as in FIG. 45 to FIG. 49.

Each category created is associated with one or more species. This arrangement provides simple flexibility when a user creates a tournament. The actual order of the creation of species and categories are interchangeable. In this embodiment, the species selection comes first, but in other embodiments, the category could come first. Two database fields are created, one for species and another for categories.

Most existing tournaments are single species and categories all in one. E.g. Largest 5 bass. That is the design of the tournament, they just fish for the 5 largest bass.

The method detailed here allows a user to create and run not only single species, but multi-species tournaments and yet the participant can make a single fish entry into a complex set of arrangements for prize categories and leaderboards. Defining species and categories this way not only makes sense during creation, but also allows the platform to have a simple and flexible design that will later be used to display leaderboards.

After creating the species and prize categories, the user has a final opportunity to review a summary of the tournament. The user can go back and make edits or create the contest and list it on the platform.

Creating the Tournament

From the home screen, pressing the SET UP A TOURNAMENT button 240, starts the process of Setting up a Tournament.

Contact information from the user profile is displayed here and can be edited as depicted in FIG. 7. The user presses continue and a tournament name, body of water, zip code, country, and gps location, start date and time, end date and time are entered, as shown in FIG. 8. The user presses continue and FIG. 9 for entering divisions is displayed.

The user can enter the name of the division here and the associated fee. They then press the plus (+) button 325. The division and the fee will be moved up to area 320. If the user. The user needs at least one division entered here in order to be able to continue to wants to remove the division, they can press the minus (−) sign and the division will be removed the next page for entering species and categories.

The user enters species as depicted in FIG. 10. They can type in the name of any custom species or select a name from a smart list of predefined species. After entering the name, the user presses the plus (+) button 333. If the user wants to remove the species, they can press the minus (−) sign and the species will be removed. The user continues with this until they add every species that they would like to fish for in their tournament. They then press the continue button.

The screen for FIG. 11 allows the user to enter any one of 4 predefined categories 336, plus one extra category called Define your own. The categories in 336 are defined in appendix XX.

The operation of entering categories is similar to that of species. The user picks one of the predefined categories from the drop down list. E.g. Largest. They next pick a species from the drop down list. E.g. Bass. When the user press the plus (+) button 338, the category is added. If they want to remove the category, they can press the minus (−) sign and the category will be removed. Note that the continue button is grayed out and not available until the user presses the (+) button and adds the category that they are working on.

The entering of a Wild Card category is the same as above. The entering of a User Defined category is also the same. The entering of a Grand Slam category uses the same process except that three species will need to be added. The entering of a stringer uses the same process except that a species and a quantity will need to be added.

The categories entered will become leaderboard categories. Leaderboards are comprised of fish data and fish media. Examples are FIG. 920 through FIG. 49. Note that a participant could make a submission of a species (bass) with just one entry and the software would automatically update all 4 leaderboards. Largest Bass shown in FIG. 45, Stringer of 5 Bass FIG. 46, Grand Slam FIG. 47, and Wild Card Bass FIG. 48 would all be updated.

The user continues to enter as many categories as they want for their tournament before pressing the final continue button, which will navigate them to FIG. 38.

FIG. 14 is the final summary screen. It shows the tournament name, the body of water, the location, the start and end dates and times, the divisions with their associated cost, and the leaderboard categories that will be created. User reviews and makes changes or presses the create button 350 and the tournament is created.

After the tournament is created, the tournament application displays a confirmation message. The host is then given an option for inviting invite participants via social media, text, or email, or via any other application that is running on that mobile device.

Other Embodiments of Creating a Tournament

Note that in the embodiment above, the description of the size of the fish is unit-less. Since it is unit-less each tournament host can decide to use their own units, such as cm, inches, pounds, or kilograms, depending on the most common units for their country and their tournament type. In other embodiments, the units might be predefined. In yet other embodiments, a calculation might be used that converts units from length to weight or from weight to length. In another embodiment, total size (weight or length) of all fish caught might be desired and this might be included as a standard category.

In another embodiment, an additional screen with checkbox options are included that 1) allows a tournament host to keep a tournament private or invite only and 2) allows a tournament to require a digital check-in, see FIG. 25.

In another embodiment, the tournament is saved and must be approved before it is listed as a live tournament that participants can join. In this case, the create button is a "save" button. The tournament is saved on the users tournament list on the home screen and after saving a tournament, the user can go back to it at any time and press the create button 350.

In another embodiment, see FIG. 21, the tournament hosts set up team fishing as a part of the tournament. This is set up either as a two person team, which simply combines scores for both fishermen, or as a Big Team Battle, with a stated number of participants on a team and where all fish entered combine into a team score. This type of tournament allows participants to sign up as teams, with all participants scoring and entering fish submission for the team. This team fishing concept is valuable for high school and college fishing teams.

In another embodiment of the tournament creation, during the selection of the location, the user selects an area that encompasses the gps location for the tournament. FIG. 43 shows Lake Mary on a map. The user draws a closed boundary around Lake Mary and defines the space inside of the enclosed area as the valid gps location for the tournament. See FIG. 9a. GPS locations outside of this boundary would not be valid and a tournament judge would be given a rejection notification during fish submission review FIG. 8d and FIG. 8e.

Description of the Predefined Categories in FIG. 11, Category List for Creating a Tournament 336:

Largest: This sorts entries of the associated species in order from largest to smallest.

Stringer: The stringer includes a species and also a stringer quantity "n". The platform takes all entries of the participant and sorts the species by size from largest to smallest. It then takes the largest "n" fish in the stringer and makes a total. For example, if the stringer was defined as a "stringer of 5 bass" and the participant entered 14 bass into the competition, the tournament engine would sort bass from largest to smallest, take the participant's 5 largest bass, total the 5 bass together and then provide one result. This result would be a "stringer of 5 bass". This total for the stringer of 5 bass, will be compared to other participant's 5 bass and placed on a leaderboard. If the participant on the leaderboard is clicked, a list of that participants 5 largest bass entries will be displayed. Each entry can be clicked individually and examined in detail by anyone viewing the leaderboard.

In another embodiment, the stringer might be called something else, such as a "bag limit".

In another embodiment, the stringer quantity might be infinite, so that all fish caught are summed and included in the stringer total.

Wild Card: This is a randomized category that is associated with a species to create a randomized leaderboard. There is no sorting of any entries for this category and instead the submitted entries are just recorded on the leaderboard in any order, as the fish are caught and as the entries are submitted. At the end of the tournament the category is randomly sorted by using a "SHUFFLE" button as shown in FIG. 12 item 337. This button scrambles all of the entries on this leaderboard so that the entries are placed into a new random order. This helps the host select random winner(s).

Grand Slam: The grand slam category is associated with three species. The participant's largest of each species is tracked and then the three species are added together for a total quantity that is displayed on the Grand Slam leaderboard. The participant enters each fish as they catch it and the software will automatically sort the largest from each species and tabulate the results and display them on the leaderboard.

An example of a Grand Slam would be a Grand Slam of Redfish, Bluefish, and Greenfish. A participant catches 14 fish and each redfish, bluefish, and greenfish is entered. The largest of each species would be taken, and then added together for one score.

The Redfish sizes are: 20, 21, 23. (largest is 23)
The Greenfish sizes are: 7, 8, 6, 5, 7. (largest is 8)
The Bluefish sizes are: 4, 4, 5, 7, 6, 3. (largest is 7)

The grand slam score for these 3 fish is 23+8+7=38. Each participant's score is calculated in this manner and the scores are sorted on the leaderboard.

User Defined: This is a category that works the same as the "Largest" category, but with a user defined name. Instead of a leaderboard called "Largest Bass". It would behave exactly the same, but would be called "User Defined" Bass. This could be the "Longest" bass or the "Heaviest" bass. It is useful also in that it could be called the "Cabelas Bass", the "Microsoft Bass", etc. and be used as a sponsorship opportunity.

Rehosting a Tournament

FIG. 15 button 355 shows how to rehost a tournament. A lot of fishing tournaments are set up to be monthly or annual events. The process of rehosting a tournament on the platform is easy. To set another copy of the tournament all the host need to do is hit the "rehost" button 355 and the tournament will be rebuilt like it was the first time. The existing parameters and fields are automatically recreated. The host needs to choose the new dates/times and the other variables stay the same as default. The host has the ability to edit the other variables as needed, but the tournament is recreated quickly and easily for the host.

When a tournament is "re-hosted" the tournament host has the option to "send an invite" all past participants via social media, text, or email, or via any other application that is running on that particular mobile device. The invite consists of a link to the tournament so that the participant can join.

Tournament Information Screen FIG. 16

FIG. 16 shows information on the tournament that was created. This information can be accessed by a participant at any time by clicking on the tournament from their home screen, see 460 on FIG. 24. If the participant is actively fishing in a tournament, the (i) button, see FIG. 45 button 46, will also bring them to the information screen.

Back on FIG. 16, the header information, tournament logo, start and end time and date, tournament name, body of water and location are all shown in 360. The number of participants who have already joined and the cost to join are also displayed here.

Downward arrow 361 can be used to expand and show the full Tournament Overview. There is a standard tournament overview that welcomes users, describes how to enter a fish, and describes the categories. The standard overview can be altered if the user goes to the tournament website and updates the tournament. If the user clicks on 361 on a mobile device, the Tournament Overview expands and will be displayed. Clicking on 361 again, causes it to contract.

Downward arrow 362 can be expanded to show the standard Rules & regulations. These are standard rules that apply to most tournaments and explain the rules to participants. These rules can be altered if the user goes to the tournament website and updates the tournament. If the user clicks on 362 on a mobile device, the Rules & regulations tab expands and will be displayed. Clicking on 362 again, causes it to contract.

Downward arrow 363 can be expanded to show the prize categories for the tournament. These prize categories are the names of the leaderboard headings. If the user clicks on 363 on a mobile device, the Prize categories tab expands and will be displayed. Clicking on 363 again, causes it to contract.

Downward arrow 364 displays the cost for the tournament. If the user clicks on 364 on a mobile device, the Cost tab expands and will be displayed. Clicking on 364 again, causes it to contract.

Downward arrow 365 displays the contact information for the tournament director. If the user clicks on 365 on a mobile device, the Contact info tab expands and will be displayed. Clicking on 365 again, causes it to contract.

The edit button 366 is only available to the tournament host. Clicking Edit 366 will take the tournament director back through all of the steps to create a tournament, giving the tournament director a chance to update the tournament and make changes.

The Leaderboard button 367 will open a display of all of the leaderboards in the tournament along with any fish entries. Leaderboards are updated as fish are submitted and data is received throughout the tournament. If a tournament has multiple leaderboards, users can swipe left or right to go to the next leaderboard.

The delete button 368 gives the tournament director the ability to delete the tournament.

Joining a Tournament

New users who want to join a tournament register for and create an account through the tournament app on their mobile device or through Facebook.

FIG. 17 discusses the process of Joining a Tournament. The user presses the FISH IN A TOURNAMENT button 230 and a list of current and joinable tournaments is displayed. For an example of such a list, see FIG. 18. The list is scrollable, sortable and searchable by any word in the title of the tournament. E.g. a user could search for "key" and any tournament that contains a tournament name with the ascii string "k-e-y" will be displayed in a scrollable list.

The user identifies a tournament they would like to participate in. Pressing on the tournament 410 results in a display of more details, see FIG. 19, about that particular tournament. After identifying a tournament, pressing on 412 starts the join process and opens FIG. 20, which acquires the participants personal information. In this embodiment that is: name, address, phone number, country, and state or province.

The user presses 415 to continue and then is presented with a choice of divisions 420. The user choses a division and then continues 425. If it is a free tournament, then pressing 425 causes them to join. It the tournament includes an entry feet, then the payment screen 45 is opened. The user pays be a means of electronic payment. After payment information is provided, the users presses 435 PAY NOW and they are now a registered participant in the tournament.

When the user goes to their home screen FIG. 24. They will now see the tournament 460 that they are participating in listed there. When they want to check in to the tournament, review details, or enter a fish in the tournament, the tournament will be easy to access because it is right on the home screen.

Other Embodiments of Joining a Tournament

In the embodiment shown payment is by credit card, but in other embodiments, payment could be by any means of electronic payment.

In another embodiment, some users might have achieved a ranking that makes them eligible or ineligible for joining certain tournaments. The ranking would be based on their merits and achievements in tournament fishing. Thus, a professional could be prevented from joining an amateur only tournament.

After the Tournament Starts

After the tournament starts, the participant goes to the tournament they are registered for FIG. 24 and selects the tournament 460. The system opens and displays the leaderboard FIG. 29 for this tournament. Here they can also view the catches of other participants in the tournament if desired.

The would click on any entry on the leaderboard and receive a more detailed view. See FIG. 50 for an example of a detailed view of an entry on a leaderboard.

Embodiment with Optional Digital Check-in

FIG. 25 shows the process at the start of a tournament for the option of digital check-in. With this option, the system time will perform a one time check with the user. The check-in button becomes available after the official tournament start time as determined by the server. See FIG. 25 and FIG. 26. For digital check-in a network connection is needed.

Most large tournaments have a check-in. This is usually done at the start in order to perform a boat check for safety items, a livewell check, a boat compartment check, or to meet other requirements of the tournament host. In some cases, this might be a video of boat livewells and compartments or a video conference or other options used to monitor and check boats at the start of a tournament. It is also used to make sure a fish hasn't been caught and that a submission does not start before the tournament starts.

Due to locations that exist between time zones and the interaction between times from different mobile network towers, some tournament participants might have automatic date and time set to manual on their mobile devices. If a user were to attempt to cheat by taking advantage of this manual setting and manipulating the time on their mobile device, they might enter a fish prematurely. To prevent users from attempting this, the enter a fish button 670 is not available until after check-in 520 is completed and the check-in is not available until after a tournament starts. After check-in is completed, the fish entry button 670 becomes available, and the tournament app can now be used to record fish with or without network availability and even in airplane mode.

A note on and the check-in option. Not all tournaments need a check-in. A long tournament that runs for a period of one month and starts immediately the day the tournament is created, doesn't need a check-in to synchronize tournament times. The tournament is open to fish submissions as soon as a participant joins and it is not possible to submit a fish before a participant has joined. For this reason, a check-in is not always needed.

After the participant checks in the leaderboard FIG. 29 is opened.

In other embodiments, the wording or display options of the check-in might differ.

The Fish Submission Process

FIG. 27 provides a platform and systems overview of the process for submitting a fish and making an entry into the tournament. This process runs in the background. When the participant begins the process of entering a fish, the submission start time is recorded. User permissions to access audio, video, and images are checked.

The tournament application controls the camera on the mobile device. The app is used to capture all media (times, images, videos, gps locations, and audio) that will be a part of the submission. Each piece of media is acquired through the app, immediately has a checksum performed, and is then encrypted. Each original piece of media is secured in this way. Because the media was acquired with the app, the media can be trusted and if changes are made to the media, the checksum would fail. If a participant where to access the memory in the mobile device and attempt to replace a photo with a different photo, the checksum test would fail upon arrival at the server. The system doesn't need to check if modifications were done or authenticate any of the media, because the system doesn't allow modifications and the media is already original.

Note the encryption is done as an extra step and precaution, but the originality of the media can be determined from the use of the checksum on a photo from a trusted source.

As stated, the system checks for any attempts to "switch or replace" any of the media by using the checksum and encryption process. Upon receipt at the server, it is confirmed that the media is original. The system confirms that the image that was acquired is the same exact image that was received. Failure of any single piece of media will affect the validity of the entire submission and the system will notify the host. Thus, the host would be alerted if a participant replaces a photo with an older photo. In this way, the system prevents users from submitting old or altered media as if it were original. A control item is not needed. This makes our tournament easier to run and the more tournaments that operate this way, the better for fish, Input from the user identifies the species by manually selecting the species from the drop down list. The species available in the dropdown list are the same ones that were predetermined during the setting up of the tournament.

The measurements of the fish are manually entered by the user.

After the images, video, audio and user input are complete, the user submits the entry.

At step 640 in FIG. 27, the submission is divided into two parts. Part 1 consists of a small amount of data made up of the user ID, the length, and the species. This small portion of the full submission is the minimum requirement needed to have a leaderboard entry at point 645 in the process. The remaining data is sent separately in part 2. Part 2 consists of the rest of the submission including video, images, audio, gps locations, and times. Part 2 will eventually fill in the remainder of the submission and might take longer, depending on network availability.

Part 1 of the transmission is a small amount of data that can normally be successfully transmitted even on a poor or slow network connection. A good analogy of this is a text. A text message on a mobile phone can normally go through even if the connection is bad, but sending a photo would require a better connection.

Tournament participants tend to move in and out of areas with poor or no network availability and this process of splitting the transmission into two parts has proven to be useful for updating tournament leaderboards throughout the day.

Note that the submission process in FIG. 27 up to point 640, is controlled locally by the tournament application running on the client-side mobile device. Even if there is no network connection at all the application still works. The application is running locally so the system can still be used to record and capture fish submissions. The application will synchronize the next time that the user is in an area where there is network availability.

Care is taken to preserve battery life and In some cases, if the participant has been out of a network area for a long time, the participant might need to check their submission and resubmit it. Manual resubmission is discussed below with FIG. 33.

At point 650 in the process of FIG. 27, after the data portion of the fish submission is successfully transmitted, the mobile device confirms this success by providing a local notification sound. The sound comes from a famous fishing guide saying "Got One!". It is still possible that the media portion of the submission has not gone through yet, but the notification indicates that the data portion of the entry has been received and is on the leaderboard.

At point 655 in the process, if the entry becomes the new leader on the leaderboard, a notification is sent out to all participants. The notification includes a link to the leaderboard and it also plays the sound of a donkey braying "Hee Haw" in order to make this announcement audible. This notification process has proven to be successful and interesting for longer tournaments that last weeks or months. Participants might be at work that day, but they get the notification of the new leader and check the progress on the leaderboard.

At point 660 in the process, the website and registered members of the tournament receive leaderboard updates. Observers can log on and view the leaderboards from their mobile device as the results are updated throughout the day.

Other Embodiments of the Fish Submission Process

In other embodiments of the fish submission process, 3rd party photo and video verification is used to ensure authenticity of an image or video that is part of the submission. The process might also include watermarking photos with a brand or logo.

In another embodiment, specialized photo processing will be implemented into the process validity check. The specialized processing detects if a participant has taken a photo of a photo and the system will notify the tournament host.

In another embodiment, input of measurements might be received by means of a networked connection to a weigh scale or other networked measuring device.

In another embodiment, the photo is interpreted by specialized software that determines the species and makes the entry for the user.

In another embodiment, the length of the fish might be interpreted by digital means, similar to the length measurement that is available on some mobile phones. In this embodiment, the length and species could be manually edited and overwritten by the participant if desired.

In another embodiment, the participant speaks the commands for taking and capturing images and videos, for entering and documenting fish size, and for submitting the entry.

In another embodiment, the documentation process involves the submission of photos and video that are taken outside of the tournament application and then authenticated by other means, such as third parties or third party photo validation software, and then submitted to the tournament at a later time or date.

In another embodiment of point 640 in the process, the transmission might be split into even more than two parts. Each component that is used might also be sent individually.

At point 650 in the process, regarding the "Got one!" sound that comes from the famous fishing guide, other embodiments might include other sounds, such as the sound of a boat motor, the sound of a fishing reel, the sound of the NBC chime, or any other type of sound for a sponsor, for a customer, for a business, or just for fun.

In another embodiment of point 655 in the process which involves the braying of the donkey, a custom sound might be provided, such as a company slogan, a business motto, a nice message, or any sound that might be desired by the tournament host.

The Operational Part of Entering a Fish

FIG. 28 shows the process from the perspective of a participant and is designed to be simple and with few steps. The participant is unaware of the processes that are running in the background.

FIG. 29 has a button on the bottom called ENTER A FISH 670. When the participant wants to submit an entry, they press "ENTER A FISH".

FIG. 30 is opened and images, video, and audio of the fish, of the participant holding the fish, and of the participant releasing the fish are captured. After obtaining enough evidence to document the fish, the participant presses the checkmark button 680 to exit the camera.

In FIG. 31, the participant is presented with an option to review the photos and images that were captured. The participant can scroll left or right to review images and video. The participant selects or deselects images and video by using the checkmark 691. The user can enter the desired species from the dropdown list if it is not already selected by the system 692 and the unit size 694 is entered. The user then submits the fish by selecting submit 698.

In FIG. 31, after the submit button is pressed, the tournament application starts the process of data transmission to the server and the screen goes back to the leaderboard of FIG. 29 and the application is read for the user to enter another fish.

In another embodiment of entering a fish, a video is recording all of the time. If the ENTER A FISH button is selected or if an audible command is given, the tournament application starts saving a portion of video automatically. Video with audio is then used to document the catching of the fish, the size measurements, the user handling the fish, and the release video (if required in the tournament rules). Audio commands or other commands during the video determine the fish size and species. When the command to submit the entry starts, the transmission begins and the tournament application is ready to start recording another entry.

Participant Checks Submission and Resubmits Entry

FIG. 33 describes the process for when a participant would like to check their entries. The participant might believe that a submission is missing from the leaderboard or they might be in a bad network area and want to check if it has gone through yet.

The participant selects the fish icon 710 shown in FIG. 34. This opens up "My Submissions" in the application FIG. 35. On this screen all of a participants submissions can be reviewed. Date/time of submission along with tournament, species, size and a status of whether the entry has gone through. The user would look for an entry like the one at 720 where the media portion is currently in process or has failed. If it has failed it will be indicated by red letters that says "not received". Selecting the entry in 720 opens up a copy of the entry FIG. 36 and an opportunity to resubmit the entry. The participant uses the resubmit button 730 if needed.

Verifying Fish Submissions

FIG. 37 provides an overview of the process for verifying a fish submission. The tournament host or a tournament judge can review, edit, and then manually confirm or deny each one.

To start the process, a judge reviews the leaderboard and selects an entry that they would like to verify. To help identify which entry the judge needs to check, entries on the leaderboard like shown in FIG. 38, are all initially shown as having a yellow status of "UNVERIFIED". If a submission has been fully checked and is approved, it is turned green and labeled as "VERIFIED". If a submission has been checked by the judge and has been denied, it receives a red label that states "DENIED".

The judge performs a full review of the entry.

Inside of each entry there is additional information to help with the process. Each entry has an automated "valid" and "reject" indicators built into the submission to help speed up the verification process. This indicator makes it easy for the host to see if the submission needs to be more closely examined in some way. Due to this indication, the verification process is easier and faster, but that is not the only improvement in the process of verifying fish.

Another improvement is that fewer fish need to be verified. In traditional and other catch and release tournaments, if there are 500 fish brought in at the end of the day, each of them needs to be officially weighed or photos reviewed, recorded, and sorted. In contrast, the tournaments on this platform have automated leaderboards that are continually sorted throughout the event. As a result, tournament hosts do not need to officially check as many submissions. If only the top 10 win out of 500 entries, then the host can just verify the top 10. This is a 50:1 reduction in the amount of work that takes place at the end of a tournament.

Another advantage is that the judge doesn't need to wait until the end of the day. If they want to verify an entry, they can do it as soon as the entry is on the leaderboard. This reduces the amount of work that has to happen at the end of the contest even further.

Another advantage of the verification process is that all participants have the ability to review the photos and examine the measurements. Participants cannot confirm or deny the entry, but this still aids the tournament host because more participants examine the entries and have the ability to call or text the tournament judge if they suspect a problem.

The Operation of Checking a Fish Submission

The tournament judge locates an entry in the leaderboard that they wish to examine such as entry 810 shown in FIG. 38. This submission is currently "unverified". The judge opens the submission and reviews it. An example of an opened entry is in FIG. 39.

The judge reviews each photo, video, and audio by swiping left or right. They look for the indication of whether it is "valid" in green text or "rejected" in red text. In this way, a judge is alerted if the media in the submission has somehow been altered or not acquired through the tournament application.

The judge also reviews whether a photo has been taken during an active tournament time. The judge might also be looking at the time and date of a photo and comparing it with the time and date of another submission.

Other determining factors that are examined include a careful scrutiny of the species 832 and the size of the fish 834. If the judge needs to change the entry, they can click on what they would like to change and alter the data. The judge also clicks any photo to open a full, high definition version such as in FIG. 40. The full high def photo is useful for zooming in and verifying the exact size of a fish.

FIG. 82. Also has a display of the participant's contact information. If the tournament judge needs to contact the participant to ask them about their entry, the information is right there. They can click on the phone number provided in 835 and call or text them.

The tournament judge ultimately decides whether to reject the entry or to confirm the entry. If the judge presses the yellow CONFIRM button 840, the entry will be updated on the leaderboard to a green VERIFIED. If the judge denies the entry, it will be updated on the leaderboard to a red DENIED.

Other Embodiments of Verifying a Fish Submission

In an embodiment of verifying a fish submission, the tournament judge receives just one overall indication of VALID (checkmark) 860 or REJECTED (X) See 850 on FIG. 39. The checkmark or X is displayed as part of each submission's details. The red X on FIG. 39 indicates that the platform has denied the entry. The judge can click on the 'X' to open a new window and review each variable from FIG. 42 and then further review anything that has been rejected. The judge can overrule the platform, can alter the entry, or can confirm the entry by pressing the confirm button 840. This embodiment with an overall indicator of the validity of the submission leads to slightly faster inspection times and greater accuracy for tournament judges.

In a continuation of the above embodiment, FIG. 41 displays the determining factors that are going into the overall indication. All of the variable components need to be valid in order for the overall indicator to be VALID. If any one of the variables is determined to be rejected, as in FIG. 42, then the overall indication is REJECTED (X).

In another embodiment, the judge receives a notification of whether a submission and its media have taken place inside of the area defined as in bounds (inside of the tournaments boundaries) See FIG. 44. The notification could be a component and variable of the overall indicator above or it could be just a GPS OK symbol that is displayed on the fish submission details page shown in FIG. 39.

Another embodiment might have a different way of labeling or a different use of color indicating the verification status. An example might be the use of symbols such as a stop light, an X, graphics, or even just a different color scheme for the text on each entry of the leaderboard.

In other embodiments, the leaderboards themselves might include photos or videos.

In another embodiment, the tournament director will receive a notification any time that a participant leaves the enclosed area and goes out of bounds. The notification is a visual indication and an audible notification, such as a text message that plays an alarm or sound and is received on the mobile device.

Online Registration, Online Payment, and Participant Management

The Platform registers participants via the mobile device or the website and automatically manages the participant list. FIG. 51 Tournament hosts can communicate with participants either as an entire group (everyone who is registered for the tournament) or on an individual basis.

Using the system to automatically maintain the participant list is also a benefit to tournament hosts. Participants join the tournament over a period of time. The participant list is automatically updated instead of requiring someone to manually add information to the contact list each time a new person joins.

It is useful to have the "text all" and "email all" feature for communicating. As an example, this feature makes it easy to communicate reminders to students from a high school fishing team who are participating in a tournament. The message doesn't need to be sent to the entire team, just the ones who are participating, so it is better to use the "text all" or "email all" feature that is built into the application.

As another example, an ice fishing tournament draws tickets from a hat and announces winners throughout the day. The tournament application is used to send a text of the winning numbers as they are awarded. This is a solution to the problem of people not being close enough to hear the announcements.

Another example of the usefulness of this feature is an emergency situation. All participants can be texted and asked to get off of the water immediately if the tournament needs to end early due to an oncoming storm.

A downloadable list of all the participants is available in the app see 1110 in FIG. 11.

Cheating Prevention

A review of some of the ways that the platform prevents cheating are listed below.

The platform makes sure that all photos and videos are taken with the application and that they are taken after the tournament starts. Previous tournaments had a need for a control item or a need to prevent and check for alterations in photos that came from various devices. This platform uses a mobile device running a client-side tournament application (a trusted source) for acquiring media used in fish submissions.

A digital check-in at the beginning of the tournament can be included as an option by the tournament host. Check-in is not available until after the tournament start time. But, gives the host a chance to verify any number of items even if the tournament participants are in a different geographic region.

There are examples of cheating where fishermen were doing things to make small increases to the weight of a fish, such as dropping lead weights or bait fish into a fishes mouth. Measuring fish by length eliminates this problem.

There are even examples of fishermen clipping the tails of their fish to make them slightly shorter so that they can bring a heavier slot fish to the weigh-in. The trimming of fish tails is not a problem, because fish are able to be measured by length and not just weight. Tournaments on this platform can measure slot fish, so this temptation to clip a fishes fin (making it shorter) is removed.

Catching a fish once and measuring it multiple times is prevented by requiring the participant to include a release video with their fish submission. A video of a healthy fish swimming away as a part of the fish submission proves that the fish has not been remeasured.

Catching fish in the wrong body of water can be detected by tracking the GPS location of the fish submission and notifying the host if there is a problem

CONCLUSIONS

The platform makes it possible for anyone with a mobile device to create and run a catch and release fishing tournament. The tournaments are easier to run and they are better for fish.

Previous tournaments were more difficult to manage, had problems preventing cheating or relied on fish weigh-ins that were bad for fish. This platform uses a mobile device running a client-side tournament application (a trusted source) with cheating prevention for acquiring media used in fish submissions Advantages:
1. Tournament fishing is possible on a mobile device: Our software makes it possible to create, manage, join, and participate in fishing tournaments on a mobile device.
2. Rehosting an annual tournament is easy: The tournament platform makes it easy to rehost a tournament that has already been created.
3. New styles of tournaments are possible: The flexibility of this platform makes it possible to create complex multi-species tournaments with new boundaries of geography and time.
4. Promotional tournaments are more feasible: The process of running a tournament is automated, less time consuming, and easier to run. Businesses can run longer contests over wider areas, exposing their brand to a larger pool of participants.
5. Removes the need for a control item: Previous tournaments had a need for a control item or a need to prevent and check for alterations in photos that came from various devices. This platform uses a mobile device running a client-side tournament application (a trusted source) with cheating prevention for acquiring media used in fish submissions.
6. Easy to Enter a Fish: The design allows for a complex, multi-species contest to be organized while keeping the process of entering a fish as simple as if it were a single species tournament.
7. Verify Submissions for Host: The platform uses technology to help tournament judges verify fish submissions. Times, locations, photos, videos, audio and all data associated with a fish submission are included in a single tool for verifying fish submissions.
8. Live Leaderboards: Observers and participants don't have to wait until the end of the tournament to see who is winning. Entries come in throughout the tournament and not at the end of the day.
9. Works without Internet or Network: Our platform has the ability to work in poor network areas and in areas with no access.
10. Leaderboard notifications: Sounds that indicate new leaders on a leaderboard add to the excitement.
11. Ease of Starting a Tournament: The placement of two buttons (one for creating, one for participating) has resulted in increased awareness by participants. After participating, user can easily try starting their own tournament.
12. Flexibility of Units: Our system allow tournaments to measure fish by weight or by length.
13. Avoids "slot fish" regulations: Our system allows all fish to be entered into a tournament even the "slot fish", since the fish are immediately released.
14. Easy Check that Participant is in a defined boundary: Our system warns tournament judges if a participant catches fish from an area that is out of bounds.
15. Unconstrained by normal time limits: The platform makes it just as easy to run a month long tournament as it is to run a single day tournament.
16. Easier to Run: Time for running a tournament and verifying the end results are greatly reduced. The platform automates the exchange of digital media, the authenticity of photos, the entering and sorting of results.
17. Fewer results to verify: With our platform, not all results need to be verified. The leaderboards are pre-sorted by the software and so fewer results need to be checked, because only the winners need to be verified.
18. Some incentives to cheat are eliminated: The platform addresses different forms of cheating and mitigates those problems.
19. It's better for fish: This platform makes it possible to run tournaments that are better for fish.

The invention claimed is:
1. A computer-implemented method for managing a fishing tournament using a client-side application running on an electronic device comprising:
   a. creating a fish submission using said client-side application, executing on a processor, to control the said electronic device, to create original fish media comprising of an image or a plurality of said images, an event time or a plurality of said event times, and fish data comprising fish species, and a fish size,
   b. recording, by a processor, a checksum immediately upon creation of each piece of fish media,
   c. encrypting each individual said image upon creation,
   d. storing into memory, by a processor, said fish media, said fish data, and said checksums until a network connection becomes available for e. transmitting, by a processor, said fish media, said fish data, and said checksums to a centralized server whenever a data connection is available,
f. processing said fish data, said fish media, and said checksums and storing results as said fish submission in memory on said server,
g. validating, by a processor, originality of said fish media by processing checksums comprising of comparing the values of said checksums recorded upon creation with the values of checksums calculated by processing the received media on said server,
h. storing results of said originality of said fish media and said fish data as a part of said fish submission on said centralized server,
i. creating an overall indicator comprising of a symbol of validity or a symbol of resection determined by said processor running on said centralized server, comprising an analysis of the validity of said fish media, and said fish data, whereby said client-side application is a trusted source for preventing cheating even without a physical control item.

2. The method of claim 1, further comprising,
a. using said client-side application, executing on a processor, to control the said electronic device, to create and capture original video or a plurality of videos as part of said fish media, whereby said fish submission on the said server contains said videos that are validated by a processor on said centralized server as original videos created by said client-side application that is a trusted source for preventing cheating, even without a physical control item and even if there is not a network connection available at the time of media creation and further whereby said fish data and said fish media are available for review and verification of said fish submission.

3. The method of claim 1, further comprising,
a. using said client-side application, executing on a processor, to control the said electronic device, to create and capture authentic and unaltered gps location as part of said fish media, whereby the location of said fish submission is validated by said processors running on said centralized server and verified as taking place inside of tournament boundaries and thereby preventing cheating.

4. The method of claim 1, further comprising,
a. transmitting, by a processor, said media and said fish data to said server in parts,
b. processing said fish data and storing results as said fish submission in memory on said server,
c. transmitting, by a processor, said fish media and said checksums to said server,
d. supplementing, by a processor, said fish media to said fish submission, whereby transmission of said fish data is sent separately from transmission of said fish media and checksums allowing for leaderboard updates when receiving data from fishing participants in areas with poor network availability further whereby transmission by a processor of said fish media and checksums is completed when network availability is improved.

5. The method of claim 1, further comprising,
a. allowing, by a processor, said reviewer to access said submission for review, the said submission's fish media and along with processor computed validity of said media,
b. allowing editing by said reviewer of said fish data,
c. accepting from said reviewer a verification comprising a confirmation or a denial of said fish entry, whereby the reviewer of the fish submission has reviewed information about a said fish submission, including the said validity of fish media, said fish size and said species, and all said dates and said times, and complete documentation without requiring that fishing participants neither bring fish in to a location for a certified weigh-in process nor include a control item in the said fish submission in order to prevent cheating.

* * * * *